US007352487B2

(12) United States Patent
Tokashiki

(10) Patent No.: US 7,352,487 B2
(45) Date of Patent: Apr. 1, 2008

(54) PRINT CONTROL SYSTEM, PRINT CONTROL METHOD, MEMORY MEDIUM, AND PROGRAM

(75) Inventor: Kiyoshi Tokashiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 836 days.

(21) Appl. No.: 10/132,204

(22) Filed: Apr. 26, 2002

(65) Prior Publication Data

US 2002/0181022 A1 Dec. 5, 2002

(30) Foreign Application Priority Data

Apr. 27, 2001 (JP) ............................ 2001-133319
Apr. 9, 2002 (JP) ............................ 2002-106958

(51) Int. Cl.
*H04N 1/393* (2006.01)
*G06F 15/16* (2006.01)
*G06F 3/12* (2006.01)
*G06K 1/00* (2006.01)
*G06K 15/02* (2006.01)

(52) U.S. Cl. .................... 358/1.18; 358/1.15; 358/1.2; 358/451

(58) Field of Classification Search .................... None
See application file for complete search history.

(56) References Cited

U.S. PATENT DOCUMENTS 5,287,194 A * 2/1994 Lobiondo .................. 358/296
5,371,837 A * 12/1994 Kimber et al. ............ 358/1.15
5,485,554 A * 1/1996 Lowitz et al. ............ 358/1.17
5,564,109 A * 10/1996 Snyder et al. ................ 710/8
5,678,000 A * 10/1997 Ohtani ...................... 358/1.2
5,721,624 A * 2/1998 Kumashiro et al. ......... 358/450
5,819,011 A * 10/1998 Fitzpatrick et al. ........ 358/1.11
5,978,557 A 11/1999 Kato ......................... 395/114
5,978,559 A * 11/1999 Quinion ..................... 358/1.15
6,348,971 B2 * 2/2002 Owa et al. ................. 358/1.15
6,437,876 B1 * 8/2002 Phang et al. ................ 358/1.2
6,476,930 B1 * 11/2002 Roberts et al. ........... 358/1.18
6,606,165 B1 * 8/2003 Barry et al. ................ 358/1.9
6,650,431 B1 * 11/2003 Roberts et al. ........... 358/1.15
6,900,902 B1 * 5/2005 Tanaka ...................... 358/1.13
6,912,311 B2 * 6/2005 Anderson et al. .......... 382/209
6,963,422 B2 * 11/2005 Unno ........................ 358/1.18
7,173,718 B2 * 2/2007 Iwata et al. ............... 358/1.13
2002/0163665 A1 * 11/2002 Iwata et al. ............... 358/1.15
2004/0061890 A1 * 4/2004 Ferlitsch ................... 358/1.15

FOREIGN PATENT DOCUMENTS

JP 9-265362 10/1997
JP 2000-112688 4/2000
JP 2002326420 A * 11/2002
JP 2003303084 A * 10/2003

* cited by examiner

*Primary Examiner*—Twyler Lamb
*Assistant Examiner*—Myles D Robinson
(74) *Attorney, Agent, or Firm*—Fitzpatrick, Cella, Harper & Scinto

(57) ABSTRACT

Even if print data is print-outputted from which printing apparatus upon distribution print, a print result in which there is no missing part of an image can be obtained. As a print area of a color MFP 104 and a monochromatic MFP 105 upon distribution print, an AND area 1403 of a print area 1401 and a print area 1402 (area 1403 in which both of the print areas 1401 and 1402 overlap on an output original) is set.

6 Claims, 25 Drawing Sheets

| PRINTER NAME | CONSTRUCTING PRINTER | SIZE | PRINTABLE AREA |
|---|---|---|---|
| GROUP PRINTER A | PRINTER A PRINTER B | A4<br>A3<br>: | "GPA4:Xa1 Ya1 Xa2 Ya2"<br>:<br>: |
| GROUP PRINTER B | PRINTER A PRINTER C | A4<br>A3<br>: | "GPA4:Xb1 Ya1 Xb2 Yb2"<br>:<br>: |
| GROUP PRINTER C | PRINTER B PRINTER C | A4<br>A3<br>: | "GPA4:Xc1 Yc1 Xc2 Yc2"<br>:<br>: |
| GROUP PRINTER D | PRINTER A PRINTER B PRINTER C | A4<br>A3<br>: | "GPA4:Xd1 Yd1 Xd2 Yd2"<br>:<br>: |

FIG. 21

| PRINTER | SIZE | PRINTABLE AREA |
|---|---|---|
| PRINTER A | A3<br>A4<br>:<br>: | "A4:Xa1 Ya1 Xa2 Ya2"<br>"A3:Xa1 Ya1 Xa2 Ya2"<br>:<br>: |
| PRINTER B | A3<br>A4<br>:<br>: | "A4:Xb1 Yb1 Xb2 Yb2"<br>"A3:Xb1 Yb1 Xb2 Yb2"<br>:<br>: |
| PRINTER C | A3<br>A4<br>:<br>: | "A4:Xc1 Yc1 Xc2 Yc2"<br>"A3:Xc1 Yc1 Xc2 Yc2"<br>:<br>: |

FIG. 29

| PRINTER | PDL | CORRESPONDENCE |
|---|---|---|
| PRINTER A | PDF | NO |
| | PS | YES |
| | : | : |
| | : | : |
| PRINTER B | PDF | YES |
| | PS | YES |
| | : | : |
| | : | : |
| PRINTER C | PDF | YES |
| | PS | NO |
| | : | : |
| | : | : |

PRINT CONTROL SYSTEM, PRINT CONTROL METHOD, MEMORY MEDIUM, AND PROGRAM

BACKGROUND OF THE INVENTION

1. Field of the Invention

The invention relates to a print control system, a print control method, a program, and a memory medium, in which printing processes of a plurality of printers upon distribution print are controlled.

2. Related Background Art

Hitherto, as disclosed in Japanese Patent Application Laid-Open No. 9-265362 and Japanese Patent Application Laid-Open No. 2000-112688, a print control apparatus for controlling distribution of a job to a plurality of printing apparatuses has been known.

However, in the above conventional techniques, in spite of a fact that print areas of printing apparatuses often differ depending on a difference of apparatus types or the like, the print area of one type of apparatus which is mainly used is often used as it is as print areas upon distribution print. No consideration is given to the print areas upon distribution print.

FIG. 18 shows print areas 1701 and 1702 in two printing apparatuses. For example, when a distribution print is executed by a printing apparatus A having the print area 1701 and a printing apparatus B having the print area 1702, if the print area 1701 is set to the print area upon distribution print, an image in which a part of characters 1705 is missing is obtained as a print result 1704 which is obtained by the printing apparatus B.

The invention is made in consideration of the above problem and it is an object of the invention to provide a print control system, a print control method, a program, and a memory medium, in which whichever printing apparatus print-outputs print data upon distribution print, a print result in which there is no missing part of an image can be obtained.

Another object of the invention is to provide a print control system, a print control method, a program, and a memory medium, in which a print area of each printing apparatus can be maximally utilized upon distribution print.

Still another object of the invention is to provide a print control system, a print control method, a program, and a memory medium, in which either a mode to perform a print in which there is no missing part of an image or a mode to perform a print in which a print area of each printing apparatus is maximally utilized can be selected upon distribution print.

Further another object of the invention is to provide a print control system, a print control method, a program, and a memory medium, in which a print in which there is no missing part of an image upon distribution print can be flexibly provided for the user.

SUMMARY OF THE INVENTION

To accomplish the above objects, according to the invention, there is provided a print control system for controlling a printing process in which a job has been distributed to a plurality of printers in accordance with a print command that is sent via a virtual printer, comprising: print area setting means for setting a print area in which print areas by the plurality of printers overlap as a print area upon distribution print; and response control means for allowing a response of the print area set by the print area setting means to be made to an inquiry from an application. There is, consequently, an effect such that the proper print area upon distribution print can be certainly warned, thereby guaranteeing normal printed matter to the user.

BRIEF DESCRIPTION OF THE DRAWINGS

FIG. 20 is a diagram showing contents of a file in which a printable area corresponding to each virtual printer for forming the PPD file has been stored;

FIG. 21 is a diagram showing contents of a file which is concerned with FIG. 20 and holds printable area information of each paper size of each printer;

FIG. 29 is a diagram showing a table which is referred to in accordance with a discrimination result about the type of the output destination side printer.

DETAILED DESCRIPTION OF THE PREFERRED EMBODIMENTS

An embodiment of the invention will be described in detail hereinbelow with reference to the drawings.

Figure 1:
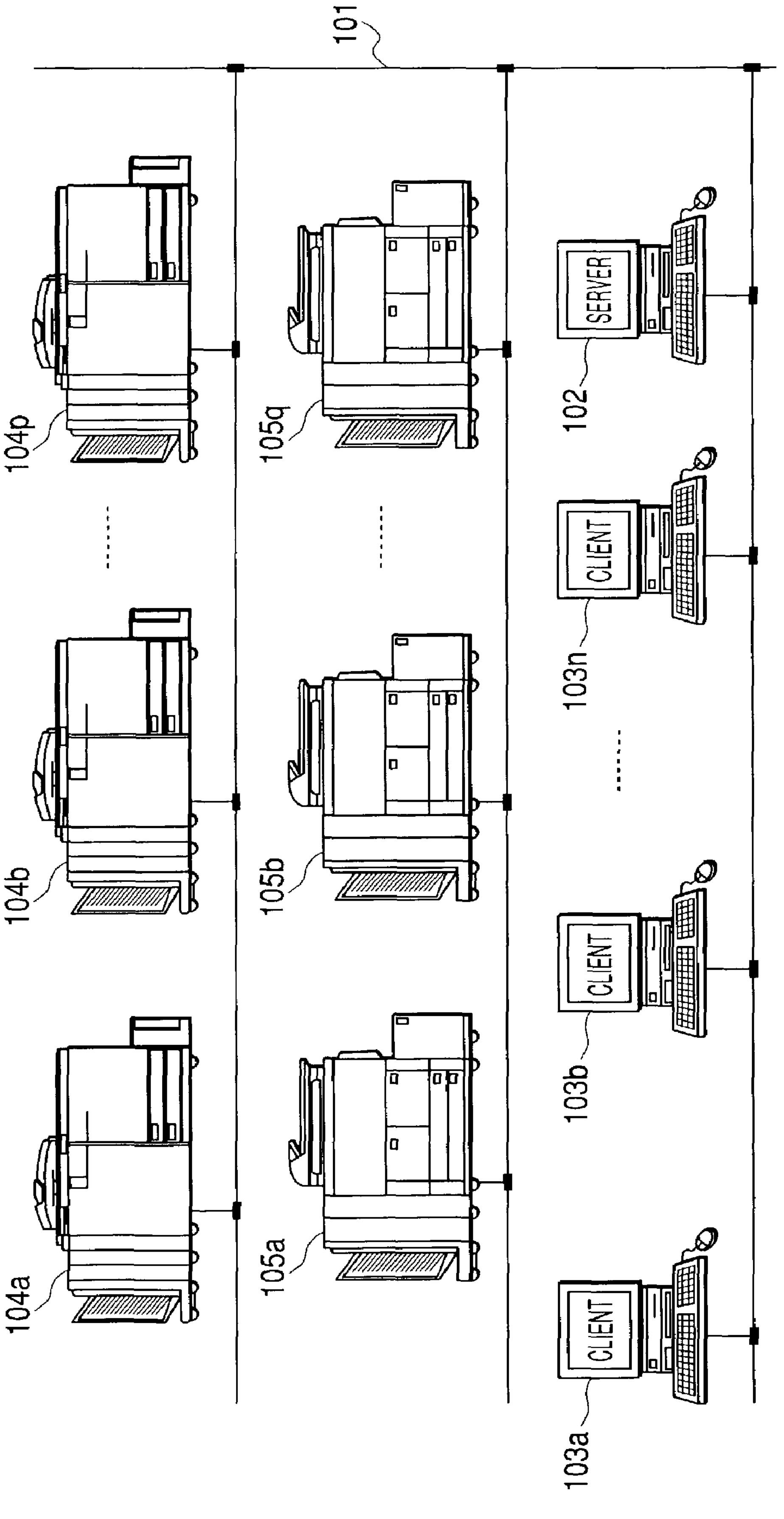
FIG. 1 is a system constructional diagram for explaining the operation of a divisional print.
Figure 2:
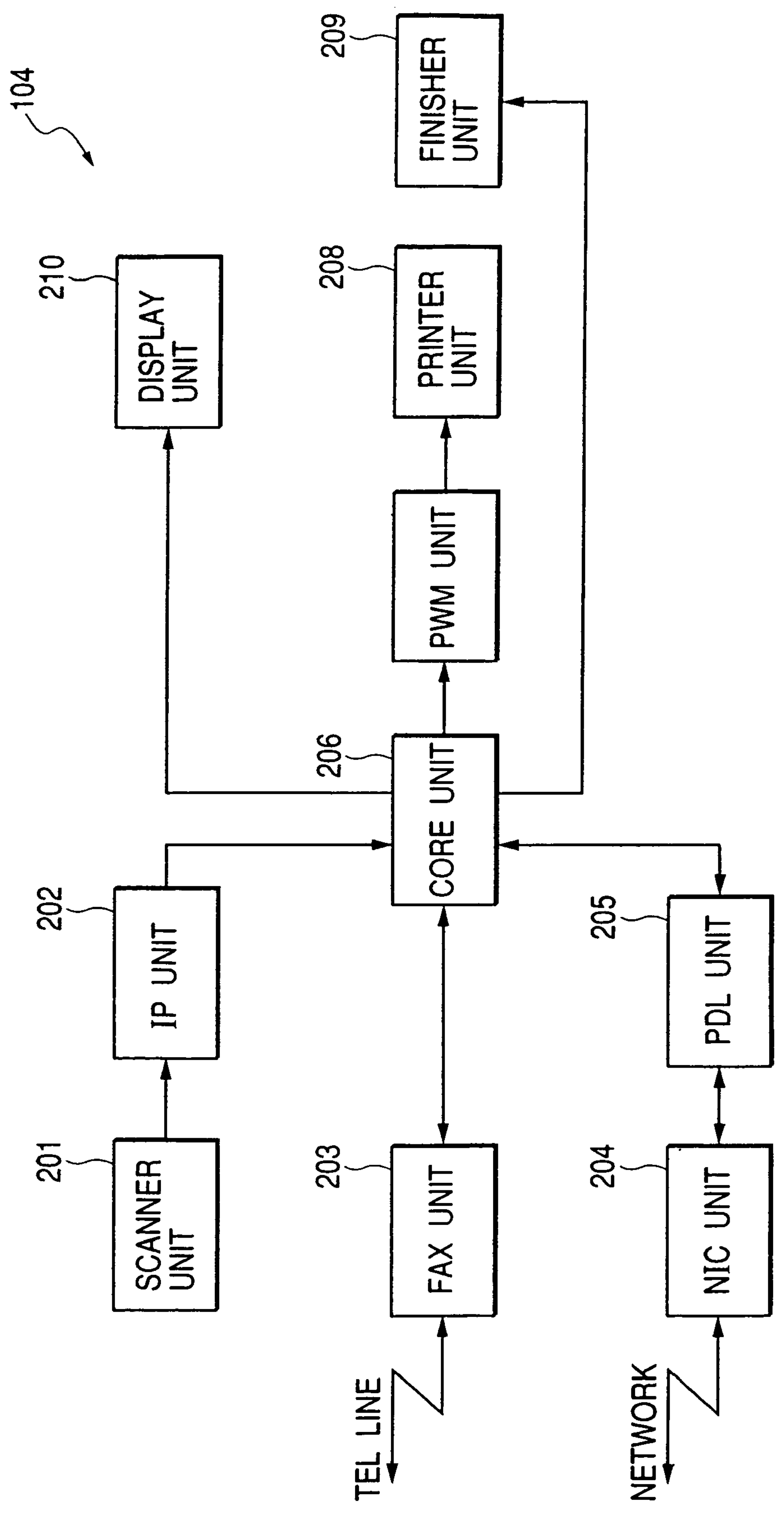
FIG. 2 is a block constructional diagram showing functionally an MFP (Multi Function Peripheral)

FIG. 1 is a schematic diagram of a system in the embodiment of the invention. A server 102 and clients 103*a* to 103*n* each of which has at least functions (CPU, ROM, RAM, bus, hard disk, etc.) of a general information processing apparatus are connected via a network 101. In the following description, a client indicative of one of the clients 103*a* to 103*n* is represented by the client 103.

Further, MFP (Multi Function Peripherals) 104 and 105 are connected to the network 101. Reference numeral 104 denotes the color MFP which can perform a scan, a print, or the like in a full color. In FIG. 1, p color MFPs 104*a* to 104*p* are connected to the network 101. With respect to the color MFP as well, in a manner similar to that mentioned above, in the following description, a color MFP indicative of one of the color MFPs 104*a* to 104*p* is represented by the color MFP 104.

Reference numeral 105 denotes the monochromatic MFP for performing a scan, a print, or the like in a monochromatic color (black and white). In FIG. 1, q monochromatic MFPs 105*a* to 105*q* are connected to the network 101. With respect to the monochromatic MFP as well, in a manner similar to that mentioned above, in the following description, a monochromatic MFP indicative of one of the monochromatic MFPs 105*a* to 105*q* is represented by the monochromatic MFP 105. Other apparatuses such as scanner, printer, facsimile, and the like can be also connected to the network 101.

Various documents/figures can be formed/edited on the client 103 by using application software for executing what is called DTP (Desk Top Publishing). The client 103 converts the formed/edited document/figure into a PDL language (Page Description Language). The document/figure converted into the PDL language is transmitted to the color MFP 104 and monochromatic MFP 105 via the network 101 and printed out.

Each of the color MFP 104 and the monochromatic MFP 105 has communicating means which can exchange information to/from the server 102 via the network 101. Each of the color MFP 104 and the monochromatic MFP 105 has a function for successively notifying the server 102 of a print status or the like by using the communicating means. Further, the server 102 has utility software which receives such information and operates and can make print management of the color MFPs 104*a* to 104*p* and monochromatic MFPs 105*a* to 105*q*.

(Constructions of the MFPs 104 and 105)

The constructions of the color MFP 104 and monochromatic MFP 105 will now be described with reference to FIGS. 2 to 12. A different point between the color MFP 104 and monochromatic MFP 105 relates to whether print data can be printed in a full color or not. In a portion other than such a color process, the color MFP often includes the construction of the monochromatic MFP. Therefore, in the following description regarding the MFPs, a target of the explanation is narrowed down to the color MFP and an explanation of the monochromatic MFP is arbitrarily added as necessary.

The color MFP 104 has: a scanner unit 201 for reading an image; an IP unit (image processing unit) 202 for processing image data read out by the scanner unit 201; a FAX unit 203 represented by a facsimile apparatus or the like for transmitting and receiving the image by using a telephone line; an NIC (Network Interface Card) unit 204 for transmitting and receiving the image data and apparatus information by using the network 101; a PDL unit 205 for developing the page description language (PDL) sent from the client 103 via the server 102 into an image signal; and a core unit 206 for temporarily storing the image signal or deciding a path (channel) in accordance with a using method of the color MFP 104 and monochromatic MFP 105.

The image data read out by the scanner unit 201 or the image data received by the FAX unit 203 or NIC unit 204 is outputted by a display unit 210 or a printer unit 208 via the core unit 206. A sheet on which the image has been printed out by the printer unit 208 is sent to a finisher unit 209 and a sorting process of the sheet is executed. The display unit 210 is used for confirming the image without printing it or confirming (previewing) a state of the image before it is printed out.

(Construction of the Scanner Unit 201)

Figure 3:
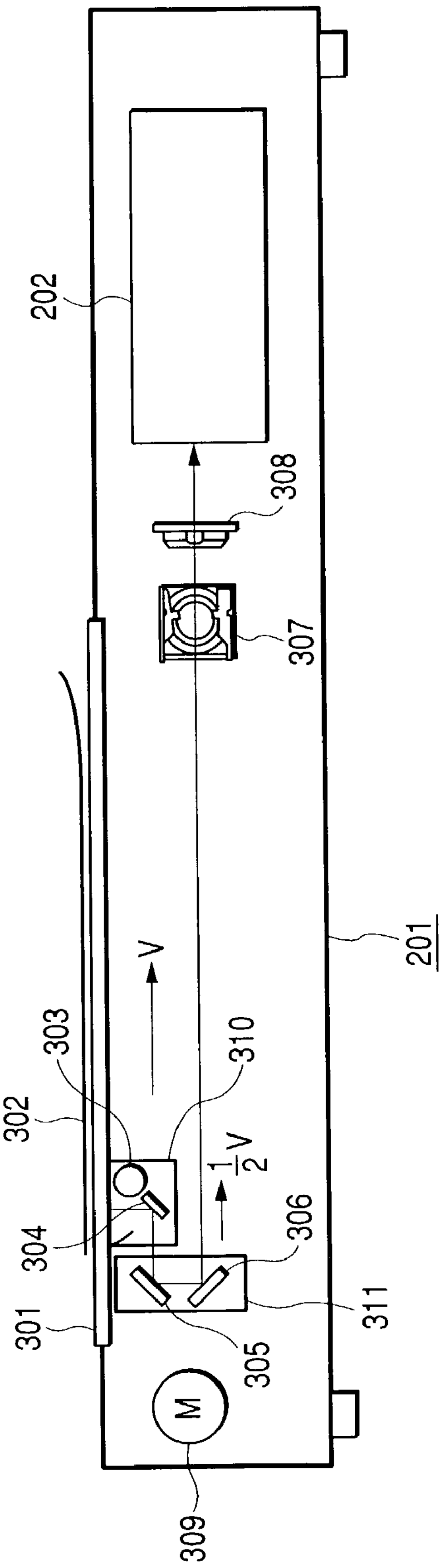
FIG. 3 is a cross sectional view showing an internal construction of a scanner unit of the MFP when it is seen from one side.

A construction of the scanner unit 201 will now be described with reference to FIG. 3. Reference numeral 301 denotes a copyboard glass on which an original 302 serving as a reading target is put. The original 302 is irradiated by an illuminating lamp 303 and its reflected light is formed as an image onto a CCD (Charge Coupled Device) 308 by a lens 307 via mirrors 304, 305, and 306. A first mirror unit 310 including the mirror 304 and illuminating lamp 303 is moved at a speed v. A second mirror unit 311 including the mirrors 305 and 306 is moved at a speed (1/2)v. The whole surface of the original 302 is scanned. The first mirror unit 310 and second mirror unit 311 are driven by a motor 309, respectively.

(Construction of the Image Processing Unit 202)

Figure 4:
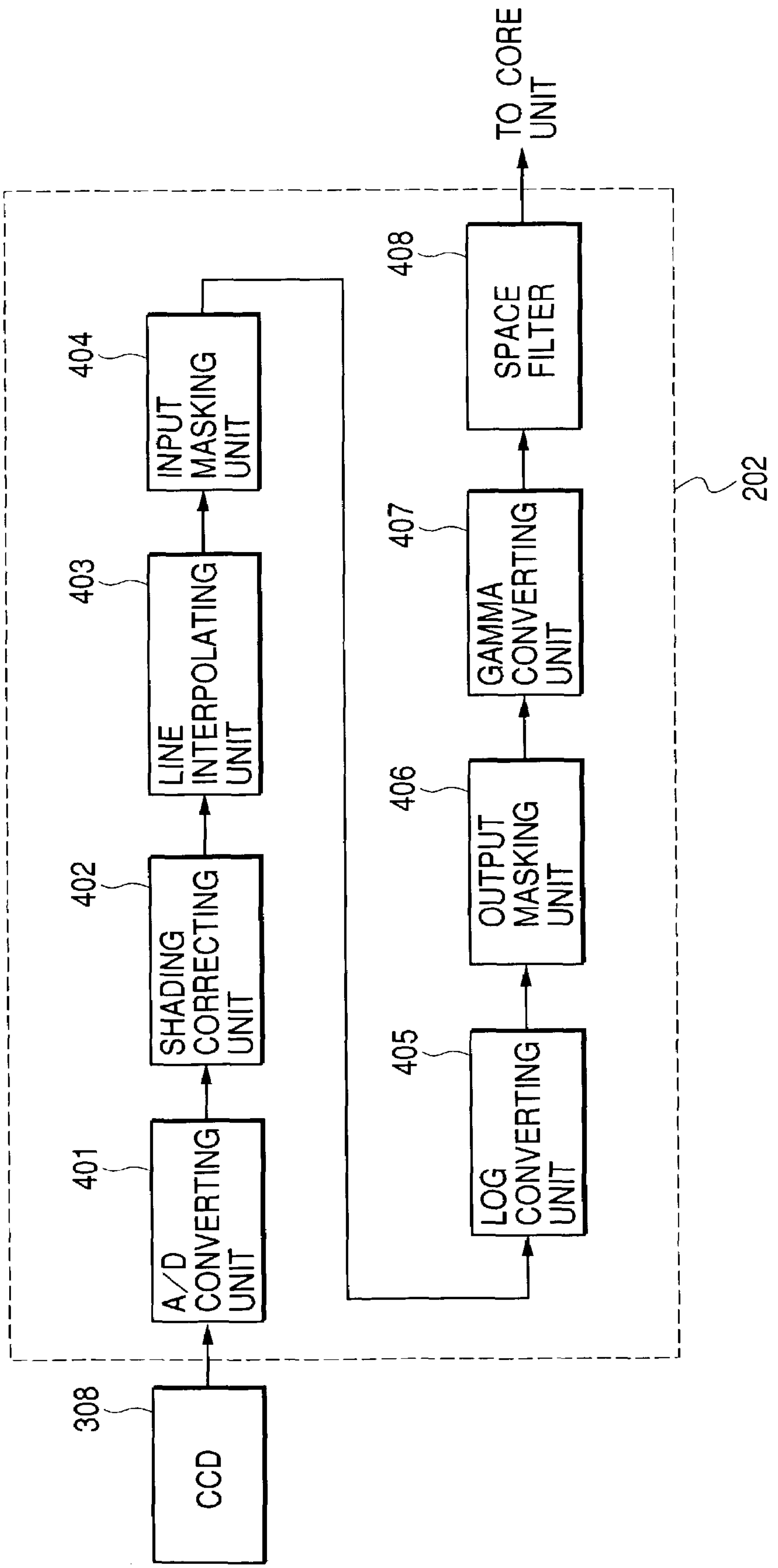
FIG. 4 is a block constructional diagram showing functionally an IP unit of the MFP.

The IP unit (image processing unit) 202 will now be described with reference to FIG. 4. First, the CCD 308 converts the inputted optical signal into an electric signal and outputs it. In the IP unit 202, the electric signal outputted from the CCD 308 is inputted to an A/D converting unit 401. In the embodiment shown in FIG. 4, the CCD 308 is a color sensor of three lines of RGB. Electric signals of the respective RGB colors are inputted to the A/D converting unit 401.

In the A/D converting unit 401, a gain control and an offset control of the input electric signal of each of the RGB colors. After that, the electric signals are converted into digital image signals (R0, G0, B0) of 8 bits every chrominance signal by A/D converters and outputted. The image signals (R0, G0, B0) outputted from the A/D converting unit 401 are subjected to a well-known shading correction using a signal read out from a reference white plate by a shading correcting unit 402. Subsequently, the image signals (R0, G0, B0) outputted from the shading correcting unit 402 are inputted to a line delay adjusting circuit (line interpolating unit) 403. Color sensors of the CCD 308 are arranged so as to be away from each other at a predetermined distance. The line interpolating unit 403 corrects a spatial deviation in the sub-scanning direction which is caused due to the arrangement of the color sensors.

An input masking unit 404 is a portion for converting a read color space which is determined by spectral characteristics of R, G, and B filters of the CCD 308 into a standard color space of NTSC (National Television System Committee). In the input masking unit 404, a matrix arithmetic operation of (3×3) is executed and the inputted image signals, (R0, G0, B0) are converted into image signals (R, G, B) of the standard color space. In the matrix arithmetic operation, constants peculiar to the apparatus which are determined in consideration of various characteristics such as sensitivity characteristics in the CCD 308, spectral characteristics of the illuminating lamp, and the like are used.

Further, a luminance/density converting unit (LOG converting unit) 405 is constructed by a lookup table (LUT) and converts luminance signals as image signals (R, G, B) into density signals (C1, M1, Y1). Reference numeral 406 denotes an output masking/UCR circuit unit (output masking unit) for converting the density signals (C1, M1, Y1) outputted from the LOG converting unit 405 into image signals (C, M, Y, K) of respective toner colors of an image forming apparatus by using a matrix arithmetic operation. The density signals (C1, M1, Y1) here are signals based on the RGB signals read out by the CCD 308. The image signals (C, M, Y, K) become signals based on spectral distributing characteristics of the toner by the matrix conversion.

Reference numeral 407 denotes a gamma converting unit to which the image signals (C, M, Y, K) outputted from the output masking/UCR circuit unit 406 are inputted. The gamma converting unit 407 converts the inputted image signals (C, M, Y, K) into image signals (C, M, Y, K) adapted to output the image by using a lookup table (LUT) which takes into consideration various characteristics of the toner. Further, the image signals (C, M, Y, K) outputted from the gamma converting unit 407 are inputted to a space filter 408. A sharpness or smoothing process is performed here. After that, the processed signals are sent to the core unit 206.

In case of executing a monochromatic image process in the monochromatic MFP 105, a 1-line CCD of a single color is used in place of the CCD 308 in the color MFP 104. With respect to each process of the A/D conversion, shading correction, input/output masking, gamma conversion, and sharpness or smoothing, a process similar to that in the color MFP 104 mentioned above is executed.

(Construction of the FAX Unit 203)

Figure 5:
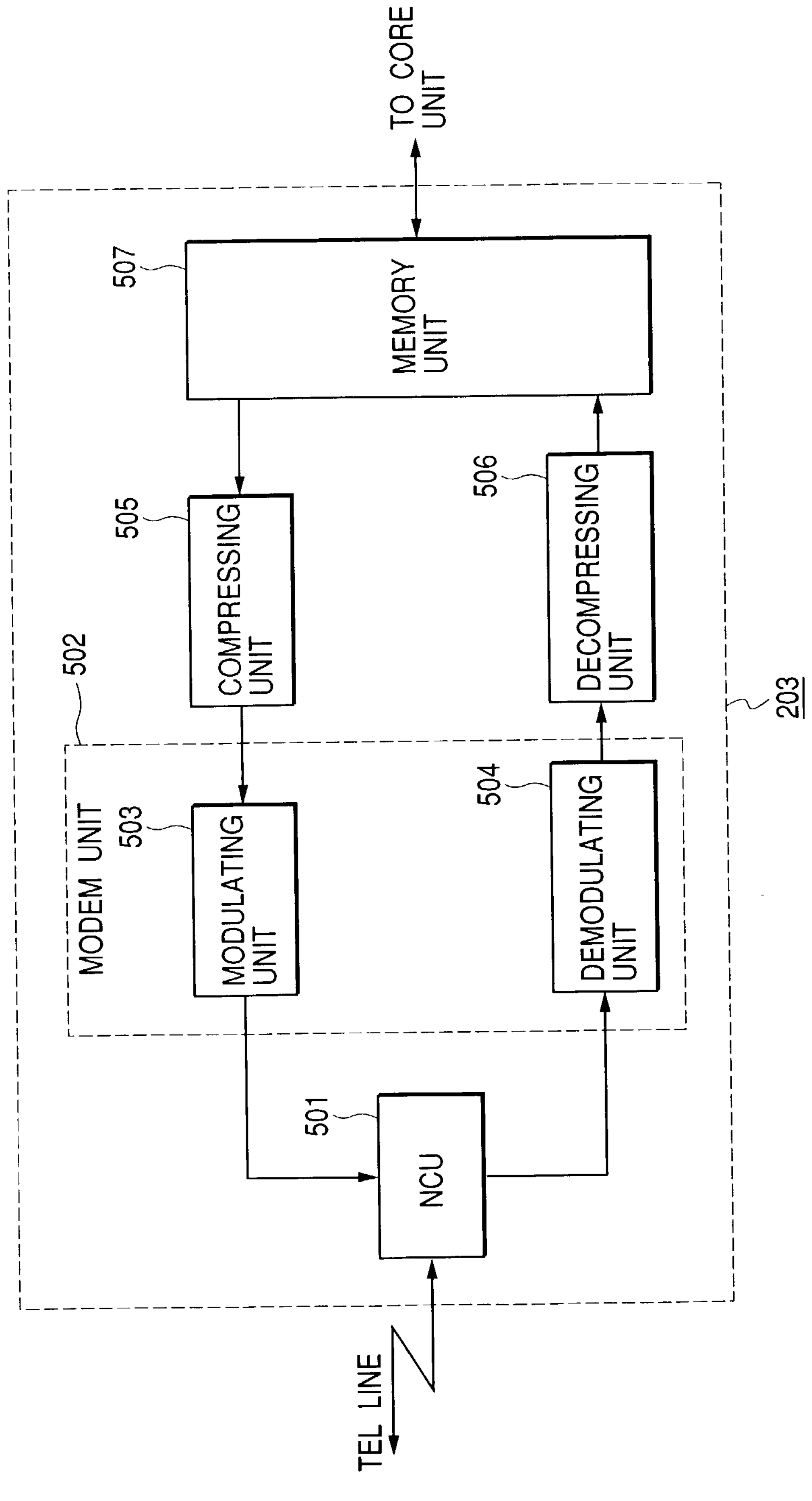
FIG. 5 is a block constructional diagram showing functionally a FAX unit of the MFP.

Subsequently, the FAX unit 203 will be described with reference to FIG. 5. First, upon reception, when data is received by the FAX unit 203 from the telephone line, the received data is first converted into a voltage by an NCU unit 501. The data outputted from the NCU unit 501 is A/D converted and demodulated by a demodulating unit 504 in a modem unit 502. After that, the resultant data is developed into raster data by a decompressing unit 506. The image data converted into the raster data is temporarily stored into a memory unit 507. After it is confirmed that there is no transfer error in the image data, it is sent to the core unit 206.

Upon transmission, the FAX unit 203 receives the image data of the raster image from the core unit 206. The image data is compressed by a compressing unit 505. The compressed image data is D/A converted and modulated by a modulating unit 503 in the modem unit 502. The resultant data is sent to the telephone line via the NCU unit 501. Generally, a run length method or the like is used for compression and decompression which are executed in the FAX unit.

(Construction of the NIC Unit 204)

Figure 6:
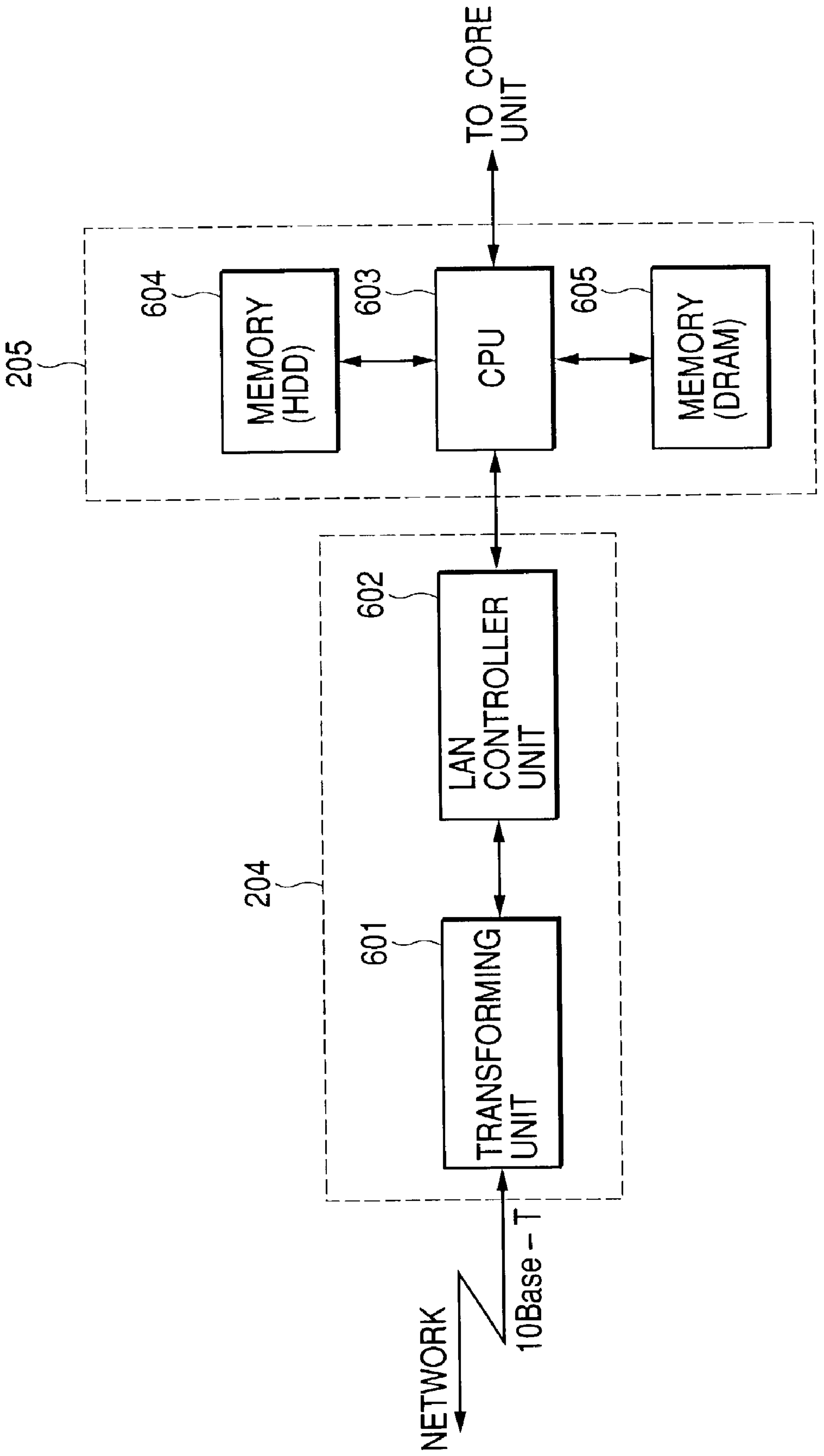
FIG. 6 is a block constructional diagram showing functionally an NIC unit of the MFP.

The NIC unit 204 will be described with reference to FIG. 6. The NIC unit 204 has a function of an interface for the network 101. For example, the NIC unit 204 plays a role for obtaining information from the network 101 and transmitting the information to the network 101 by using an Ethernet (registered trademark) cable such as 10Base-T/100Base-TX or the like.

When the information is obtained from the network 101, first, the obtained information is voltage converted by a transforming unit 601 and sent to a LAN controller unit 602. The LAN controller unit 602 discriminates whether the information received via the network 101 is information which is necessary for the color MFP 104 or not. The LAN controller unit 602 has therein a first buffer memory (not shown) and a second buffer memory (not shown). The information received from the transforming unit 601 is temporarily stored in the first buffer memory, subsequently sent to the second buffer memory, and thereafter, supplied to the PDL unit 205.

If the LAN controller unit 602 determines that the information received via the network 101 is the information which is necessary for the color MFP 104, the information is sent from the first buffer memory to the second buffer memory and, thereafter, transferred to the PDL unit 205 at the post stage. If it is determined that the information is the information which is unnecessary for the color MFP 104, it is deleted when the information has been accumulated in the first buffer memory.

If information has been provided to the outside via the network 101, necessary information is added by the LAN controller unit 602 to the information sent from the PDL unit 205, and the resultant information is outputted to the network 101 via the transforming unit 601.

(Construction of the PDL Unit 205)

The PDL unit 205 will be described also with reference to FIG. 6. The image data formed by the application software which operates on the client 103 is constructed by a document, figures, photographs, etc. and comprises a combination of image description elements such as character codes, figure codes, raster data, and the like. What is called PDL is constructed by those data as elements and represented by a PostScript (registered trademark) language of Adobe Co., Ltd.

The PDL unit 205 executes a converting process for converting the PDL data into the raster data. First, the PDL data sent from the NIC unit 204 is once stored into a memory 604 of a large capacity such as a hard disk (HDD) via a CPU unit 603 and managed and stored every job in this memory.

Subsequently, the CPU unit 603 executes a rasterization image process called RIP (Raster Image Processing) as necessary, thereby developing the PDL data into the raster data. Color components of CMYK of the developed raster data are stored page by page every job in a semiconductor memory 605 such as a DRAM which can be accessed at a high speed. The CPU unit 603 reads out the raster data from the semiconductor memory 605 in accordance with a situation of the printer unit 208 and sends it to the core unit 206.

(Construction of the Core Unit 206)

Figure 7:
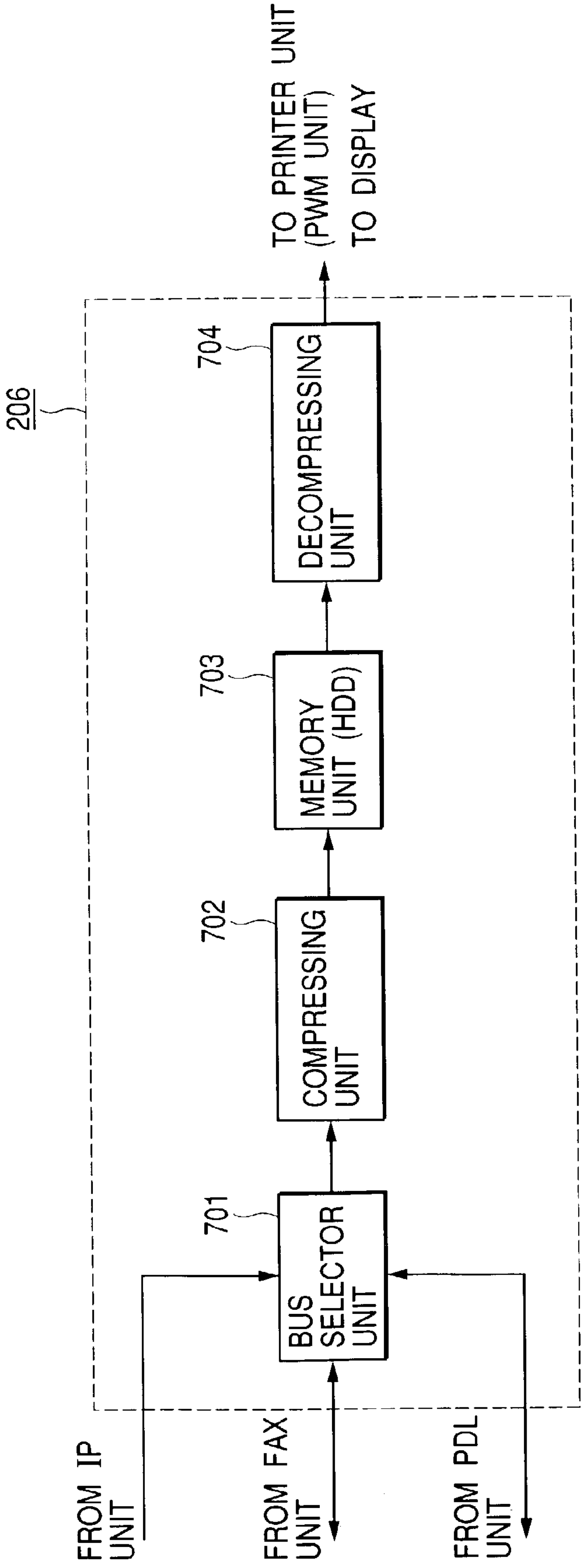
FIG. 7 is a block constructional diagram showing functionally a core unit of the MFP.

The core unit 206 will now be described with reference to FIG. 7. A bus selector unit 701 of the core unit 206 plays a role of what is called traffic control in an information transmission in the color MFP 104 and monochromatic MFP 105. That is, it is a portion for switching a bus in accordance with each function in the color MFP 104 and monochromatic MFP 105, such as copying function, network scan, network print, facsimile transmission/reception, display, or the like. Bus switching patterns for executing the above functions will be shown below.

Copying function:

Scanner unit 201→core unit 206→printer unit 208

Network scan:

Scanner unit 201→core unit 206→NIC unit 204

Network print:

NIC unit 204→core unit 206→printer unit 208

Facsimile transmitting function:

Scanner unit 201→core unit 206→FAX unit 203

Facsimile receiving function:

FAX unit 203→core unit 206→printer unit 208

Display function:

(One of the scanner unit 201, FAX unit 203, and NIC unit 204)→core unit 206→display unit 210

The image data outputted from the bus selector unit 701 is sent to the printer unit 208 (PWM unit 207) or display unit 210 via a compressing unit 702, a memory unit 703 comprising a memory of a large capacity such as a hard disk (HDD) or the like, and a decompressing unit 704. It is sufficient to use a general compression system such as JPEG, JBIG, ZIP, or the like as a compression system which is executed in the compressing unit 702. The image data compressed by the compressing unit 702 is managed every job and stored in the memory unit 703 together with additional data such as file name, implementor, date/time of creation, file size, etc.

Further, if the number and a password of the corresponding job are provided every image data which is outputted from the compressing unit 702 and also stored as additional data of the image data into the memory unit 703, a personal box function can be supported. The personal box function is a function for enabling data to be temporarily stored or enabling only a specific person to print out (read out the data from the HDD). When the specific user designates the job number, issues a command to print out, and enters the password, it is collated with the passwords stored in the memory unit 703 together with the job number. If both passwords coincide as a result of the collation, the image data corresponding to the job number is read out from the memory unit 703, returned to the raster image by the decompressing unit 704, and sent to the printer unit 208.

(Construction of the PWM Unit 207)

Figure 8A:
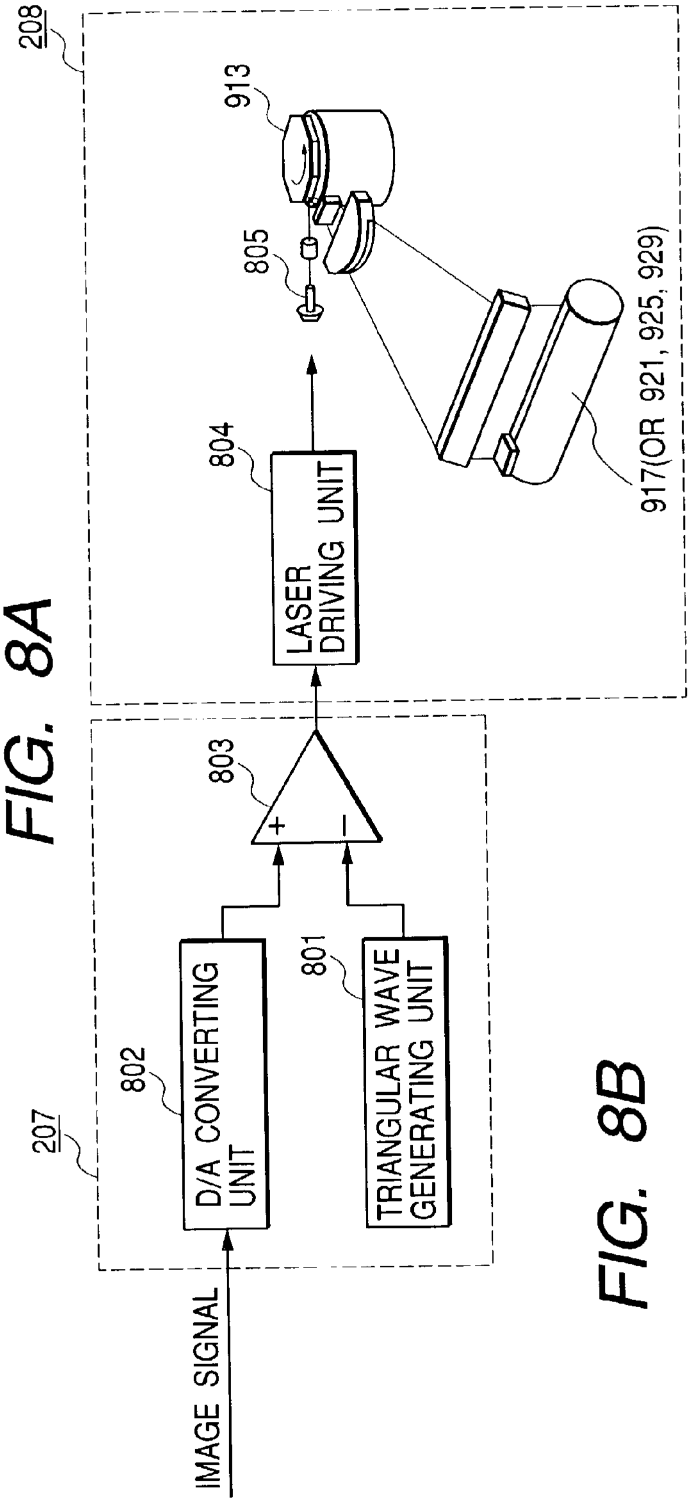
FIGS. 8A and 8B are block constructional diagrams showing functionally a PWM unit of the MFP.
Figure 8B:
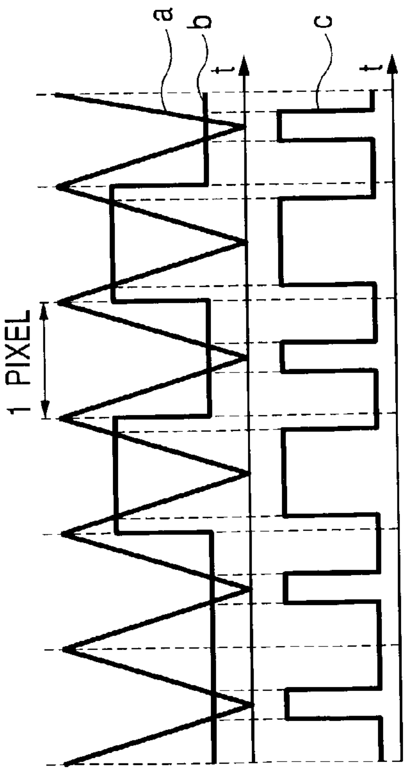

The PWM unit 207 will be described with reference to FIGS. 8A and 8B. The image data which has been outputted from the core unit 206 and color-separated into four colors of yellow (Y), magenta (M), cyan (C), and black (K) (in case of the monochromatic MFP 105, a single color) is inputted to the PWM unit 207 prepared every color. Reference numeral 801 denotes a triangular wave generating unit and 802 indicates a D/A converter (D/A converting unit) for converting a digital signal which is inputted into an analog signal. An amplitude of a signal ("a" in FIG. 8B) which is generated from the triangular wave generating unit 801 and that of a signal ("b" in FIG. 8B) which is outputted from the D/A converter 802 are compared by a comparator 803 and sent as a signal as shown in "c" in FIG. 8B to a laser driving unit 804.

The operation of the laser driving unit 804 is controlled by the signal ("c" in FIG. 8B) having a rectangular waveform which is inputted. In the printer unit 208, the laser driving unit 804 drives a semiconductor laser 805 by the control of the PWM unit 207. A laser beam emitted from the semiconductor laser 805 scans on a photosensitive drum 917 by a polygon mirror 913.

(Construction of the Printer Unit 208 (In Case of the Color MFP 104))

Figure 9:
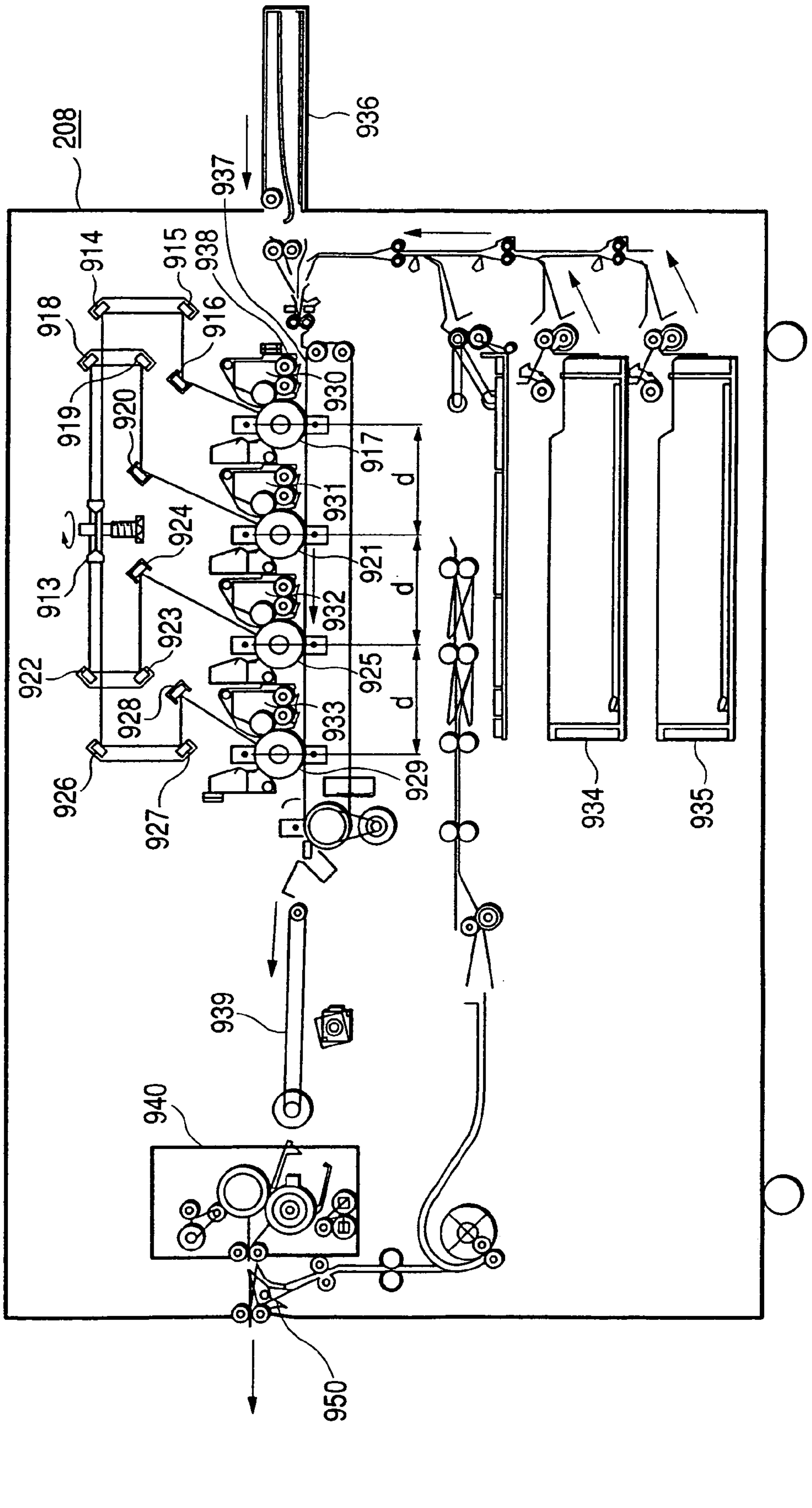
FIG. 9 is a cross sectional view showing an internal construction of a printer unit of a color MFP when it is seen from one side.

FIG. 9 shows a schematic diagram of the printer unit 208. The polygon mirror 913 receives four laser beams emitted from the semiconductor lasers 805. One of them scans the photosensitive drum 917 via mirrors 914, 915, and 916. The second one of them scans a photosensitive drum 921 via mirrors 918, 919, and 920. The third one of them scans a photosensitive drum 925 via mirrors 922, 923, and 924. The fourth one of them scans a photosensitive drum 929 via mirrors 926, 927, and 928.

Reference numeral 930 denotes a developing device for supplying the toner of yellow (Y). The developing device 930 forms a yellow toner image onto the photosensitive drum 917 in accordance with the scan of the laser beam. Reference numeral 931 denotes a developing device for supplying the toner of magenta (M). The developing device 931 forms a magenta toner image onto the photosensitive drum 921 in accordance with the scan of the laser beam. Reference numeral 932 denotes a developing device for supplying the toner of cyan (C). The developing device 932 forms a cyan toner image onto the photosensitive drum 925 in accordance with the scan of the laser beam. Reference numeral 933 denotes a developing device for supplying the toner of black (K). The developing device 933 forms a black toner image onto the photosensitive drum 929 in accordance with the scan of the laser beam. The toner images of four colors (Y, M, C, K) as mentioned above are transferred onto the sheet of paper, so that an output image of a full color can be obtained.

The sheet of paper fed from one of sheet cassettes 934 and 935 and a manual inserting tray 936 passes through a resist roller 937 and is conveyed in a state where it is adsorbed onto a transfer belt 938. The toner image of each color has previously been developed on each of the photosensitive drums 917, 921, 925, and 929. Each of the photosensitive drums 917, 921, 925, and 929 transfers the toner onto the sheet synchronously with timing for conveying the sheet.

That is, each of the semiconductor lasers 805 for irradiating the laser beams onto the photosensitive drums 917, 921, 925, and 929 is driven also synchronously with timing for conveying the sheet. The four photosensitive drums 917, 921, 925, and 929 are arranged at regular intervals so as to be away from each other by a distance "d". Each sheet is conveyed at a predetermined speed v by a conveying belt 939. The semiconductor lasers 805 are driven synchronously with such conveying timing.

Subsequently, the sheet on which the toner of each color has been transferred is conveyed to a fixing device 940 by the conveying belt 939. The transferred toner is fixed onto the sheet. The sheet which exited the fixing device 940 is once guided downward by a flapper 950. After a rear edge of the sheet exits the flapper 950, the sheet is switched back and ejected out of the apparatus. Thus, the sheet is ejected in a face-down state. When the original is printed in order from the head page, print sheets are obtained in correct page order.

(Construction of the Printer Unit 208 (In Case of the Monochromatic MFP 105))

Figure 10:
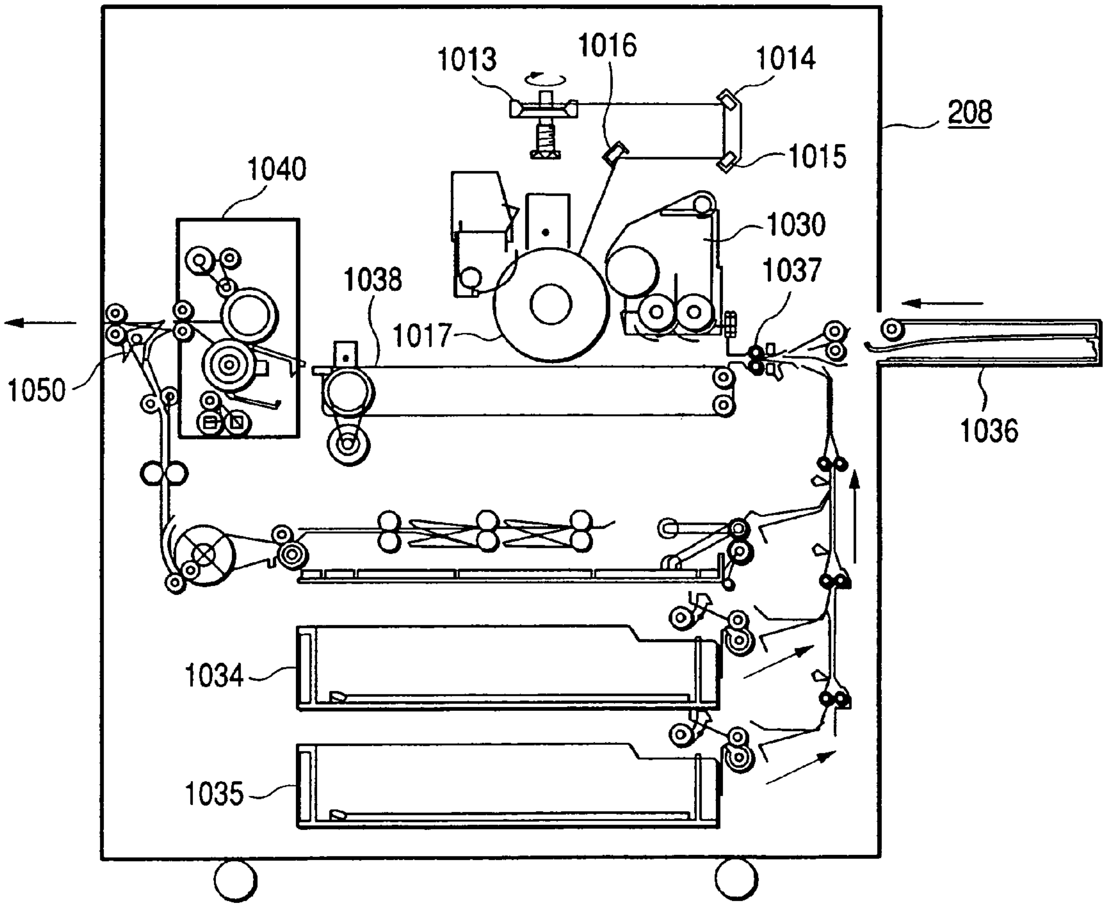
FIG. 10 is a cross sectional view showing an internal construction of a printer unit of a monochromatic MFP when it is seen from one side.

FIG. 10 shows a schematic diagram of a monochromatic printer unit. Reference numeral 1013 denotes a polygon mirror which receives the laser beams emitted from the four semiconductor lasers 805. The laser beam scans a photosensitive drum 1017 via mirrors 1014, 1015, and 1016. Reference numeral 1030 denotes a developing device for supplying toner of black. The developing device 1030 forms a toner image onto the photosensitive drum 1017 in accordance with the scan of the laser beam. This toner image is transferred onto the sheet, so that an output image can be obtained.

A sheet of paper fed from one of sheet cassettes 1034 and 1035 and a manual inserting tray 1036 passes through a resist roller 1037 and is conveyed in a state where it is adsorbed onto a transfer belt 1038. The toner image formed on the photosensitive drum 1017 is transferred onto the sheet synchronously with the conveying timing. The sheet on which the toner image has been transferred is separated from the conveying belt, and the toner image is fixed by a fixing device 1040. The sheet which has exited the fixing device 1040 is once guided downward by a flapper 1050. After a rear edge of the sheet exits the flapper 1050, the sheet is switched back and ejected out of the apparatus. Thus, the sheet is ejected in a face-down state. When the original is printed in order from the head page, print sheets are obtained in correct page order.

(Construction of the Display Unit 210)

Figure 11:
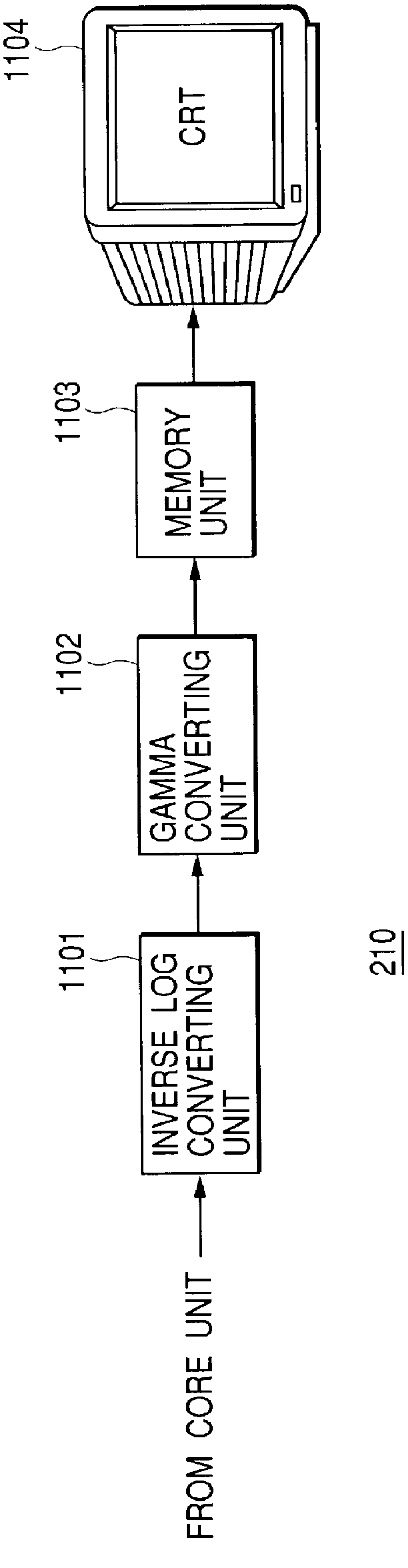
FIG. 11 is a block constructional diagram showing functionally a display unit of the MFP.

FIG. 11 shows a construction of the display unit 210. The image data which is outputted from the core unit 206 is CMYK data. Therefore, in the display unit 210 which receives the image data from the core unit 206, it is necessary to convert the image data from the CMYK data into RGB data by an inverse LOG converting unit 1101. Subsequently, in order to match the image data with color characteristics in a display apparatus 1104 such as a CRT (Cathode Ray Tube) or the like, an output conversion is executed in a gamma converting unit 1102 by using a lookup table. The image data which has been output-converted by the gamma converting unit 1102 is once stored into a memory unit 1103 and displayed by the display apparatus 1104.

The reason why the image is displayed by the display unit 210 is to use a previewing function for previously confirming an output image or a proofing function for verifying whether the image to be outputted is a desired image or not, or to omit a wasteful use of the print sheet in case of confirming an image which does not need to be printed.

(Construction of the Finisher Unit 209)

Figure 12:
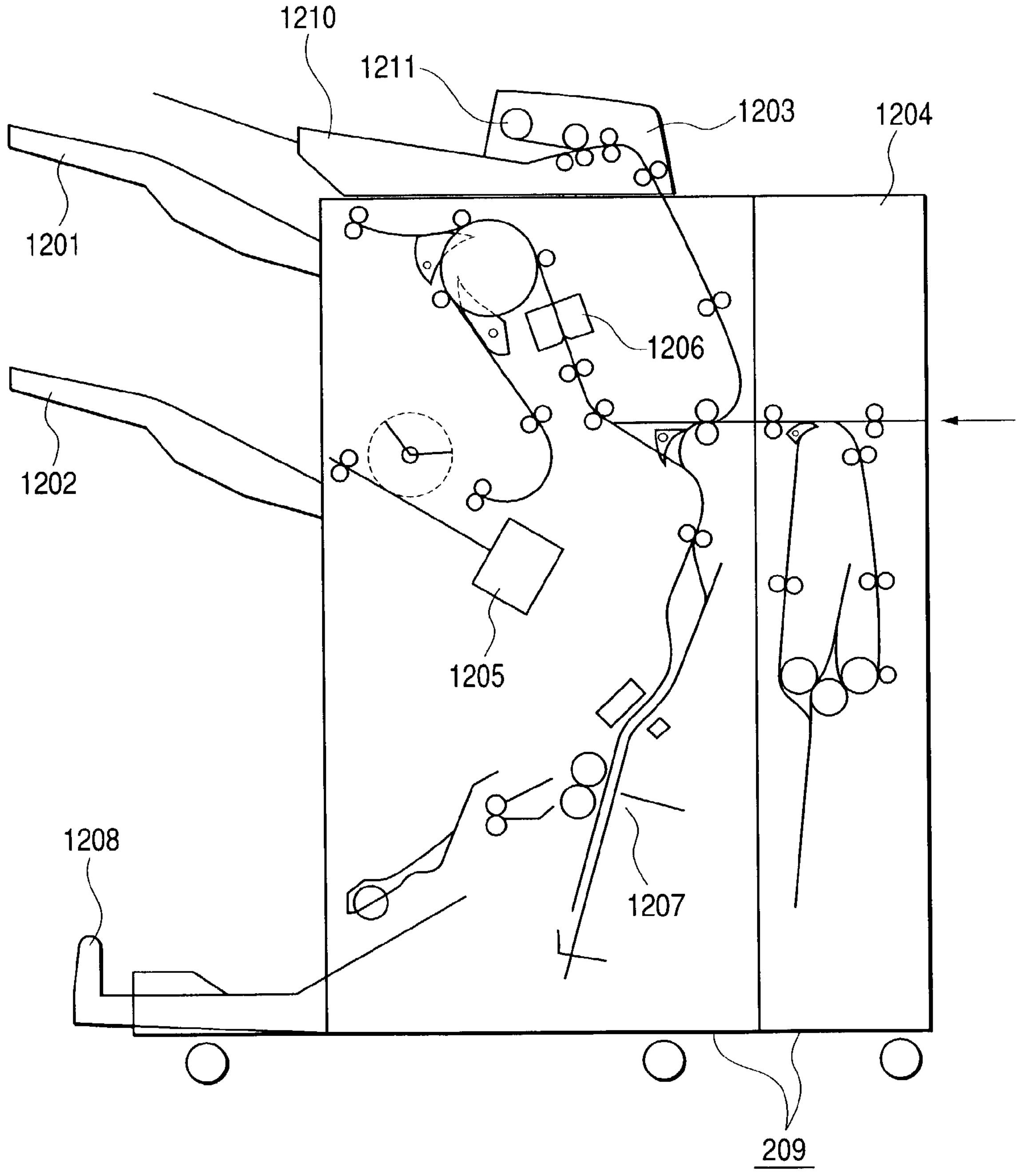
FIG. 12 is a cross sectional view showing an internal construction of a finisher unit of the MFP when it is seen from one side.

FIG. 12 shows a schematic diagram of the finisher unit 209. The sheet ejected from the fixing device 940 (or 1040) of the printer unit 208 enters the finisher unit 209. A sample tray 1201 and a stacking tray 1202 are provided for the finisher unit 209. Those trays are switched in accordance with the kind of job or the number of sheets to be ejected, and the sheet is ejected onto the selected tray.

There are two kinds of sorting systems. A bin sorting system in which a plurality of bins are provided and the sheets are sorted to each bin and a shift sorting system in which a bin (or tray) is shifted and the output sheets are sorted every job are generally known. If the core unit 206 has the memory unit 703 of a large capacity as mentioned above, an electronic sorting function can be also supported by using what is called a collating function for changing a buffered page order and an ejecting order by using such a buffer memory. Although the sorting function is a function for sorting the output sheets every job, a grouping function for sorting them every page is also known.

In case of ejecting the output sheets to the stacking tray 1202, it is also possible to construct the system in a manner such that the sheets before they are ejected are accumulated every job and, just before the sheets are ejected, they are bound by using a stapler 1205. A puncher 1206 has a Z-folding unit 1204 for folding the paper into a Z-character shape for a period of time until it reaches the above two trays, punches two (or three) holes for filing, and executes each process in accordance with the kind of job. Further, a saddle stitcher 1207 executes processes such that the center portion of the sheet is bound at two positions and, thereafter, the center portion of the sheet is sandwiched by rollers, thereby folding the sheet at the center in half and forming a booklet such as weekly magazine or brochure. The sheets bound by the saddle stitcher 1207 are ejected onto a booklet tray 1208.

Although not shown in FIG. 12, it is also possible to add another function such as binding by glue for binding, cutting for aligning edge surfaces on the binding side and the opposite side after the sheets were bound, or the like. An inserter 1203 is provided to convey the sheet set on a tray 1210 to one of the trays 1201, 1202, and 1208 without passing through the printer.

Thus, the sheet set to the inserter 1203 can be inserted (intermediate insertion) into a space between the sheets which are fed to the finisher unit 209. It is assumed that the sheet is set onto the tray 1210 of the inserter 1203 in a face-up state by the user. The sheets are fed by a pickup roller 1211 in order from the top sheet.

Therefore, the sheet is conveyed as it is from the inserter 1203 to the tray 1201 or 1202 and ejected in a face-down state. When the sheet is conveyed to the saddle stitcher 1207, it is once sent to the puncher 1206 side, thereafter, switched back, and fed to the saddle stitcher 1207, thereby aligning the directions of the faces.

(Distribution Print)

A distribution print using the network 101 will now be described. The distribution print is a method whereby one job (or a plurality of jobs) is (are) divided and divisionally outputted by a plurality of color MFPs 104 or monochromatic MFPs 105 connected to the same network, and the print sheets of a desired number of copies are outputted in desired page order from the original which is outputted by each MFP 104 or 105.

(Printer Driver)

To realize the above method, the job has to be divisionally outputted from the server 102 (or client 103) to the MFPs 104 and 105 as a plurality of image forming apparatuses. For example, the user selects the apparatus to be used from the color MFPs 104 and monochromatic MFPs 105 connected to the network 101 by using a printer driver as shown in FIG. 13 on the client 103 side, and instructs which MFP to print out which page.

Figure 13:
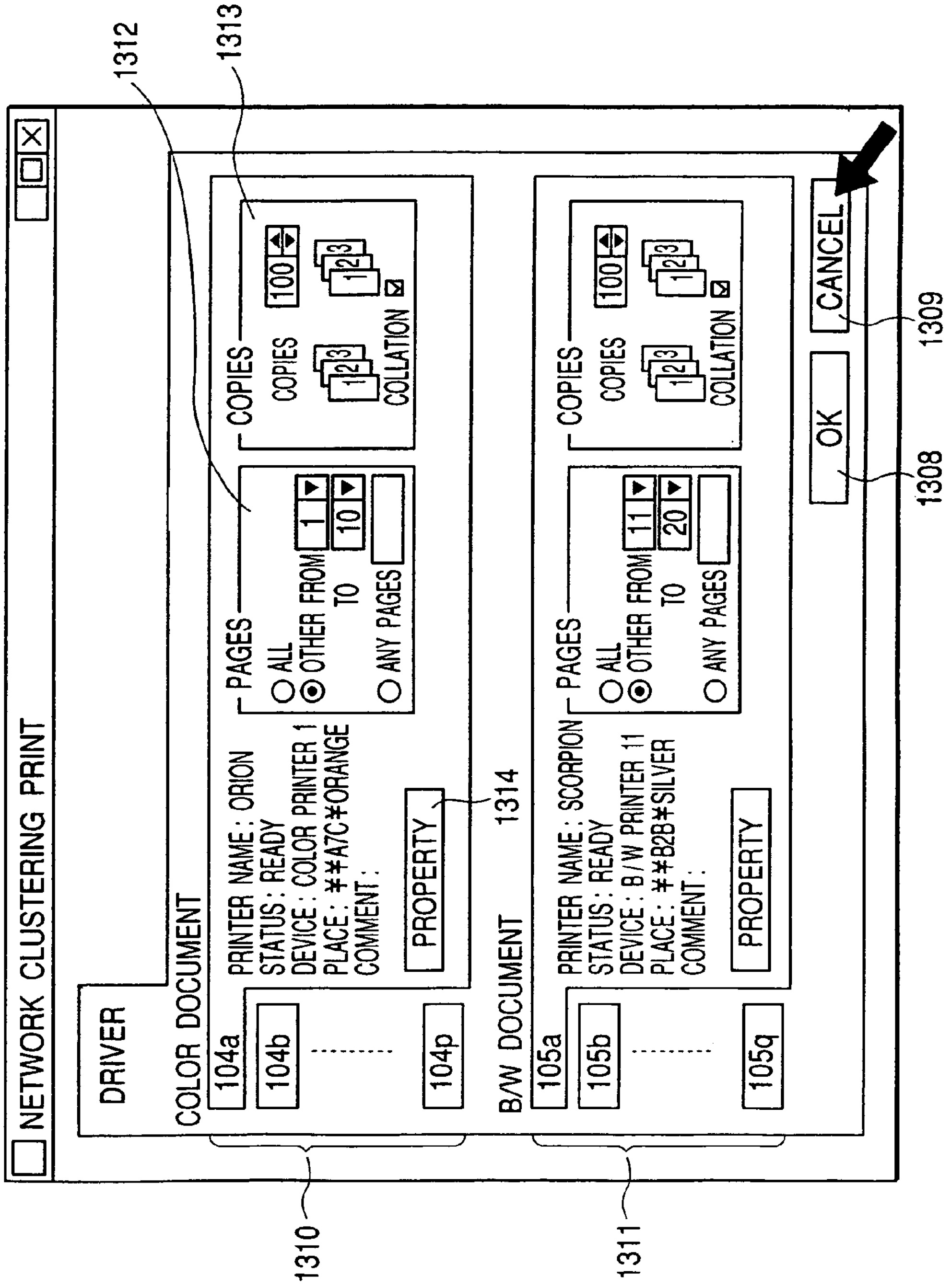
FIG. 13 is a diagram showing a specific example of a display picture plane by a printer driver.

In FIG. 13, reference numeral 1310 denotes tabs for setting the pages which are outputted by the color MFPs 104 (104*a*, 104*b*, . . . , 104*p*) and the number of copies. Similarly, reference numeral 1311 denotes tabs for setting the pages which are outputted by the monochromatic MFPs 105 (105*a*, 105*b*, . . . , 105*q*) and the number of copies. Reference numeral 1312 denotes a portion to indicate the pages and 1313 denotes a position to indicate the number of copies. The user enters a desired number of pages and a desired number of copies to those portions.

The diagram shows a setup example in the case where the color MFP 104*a* prints 100 copies of each of the 1st to 10th pages and the monochromatic MFP 105*a* prints 100 copies of each of the 11th to 20th pages, respectively. If the user clicks an OK key 1308 in this state, the actual MFP is activated and the two MFPs of the color MFP 104*a* and monochromatic MFP 105*a* simultaneously start to print. To cancel the setup, it is sufficient to click a cancel key 1309.

(Automatic Division of the Job and Discrimination about Color/Monochromatic)

Figure 14:
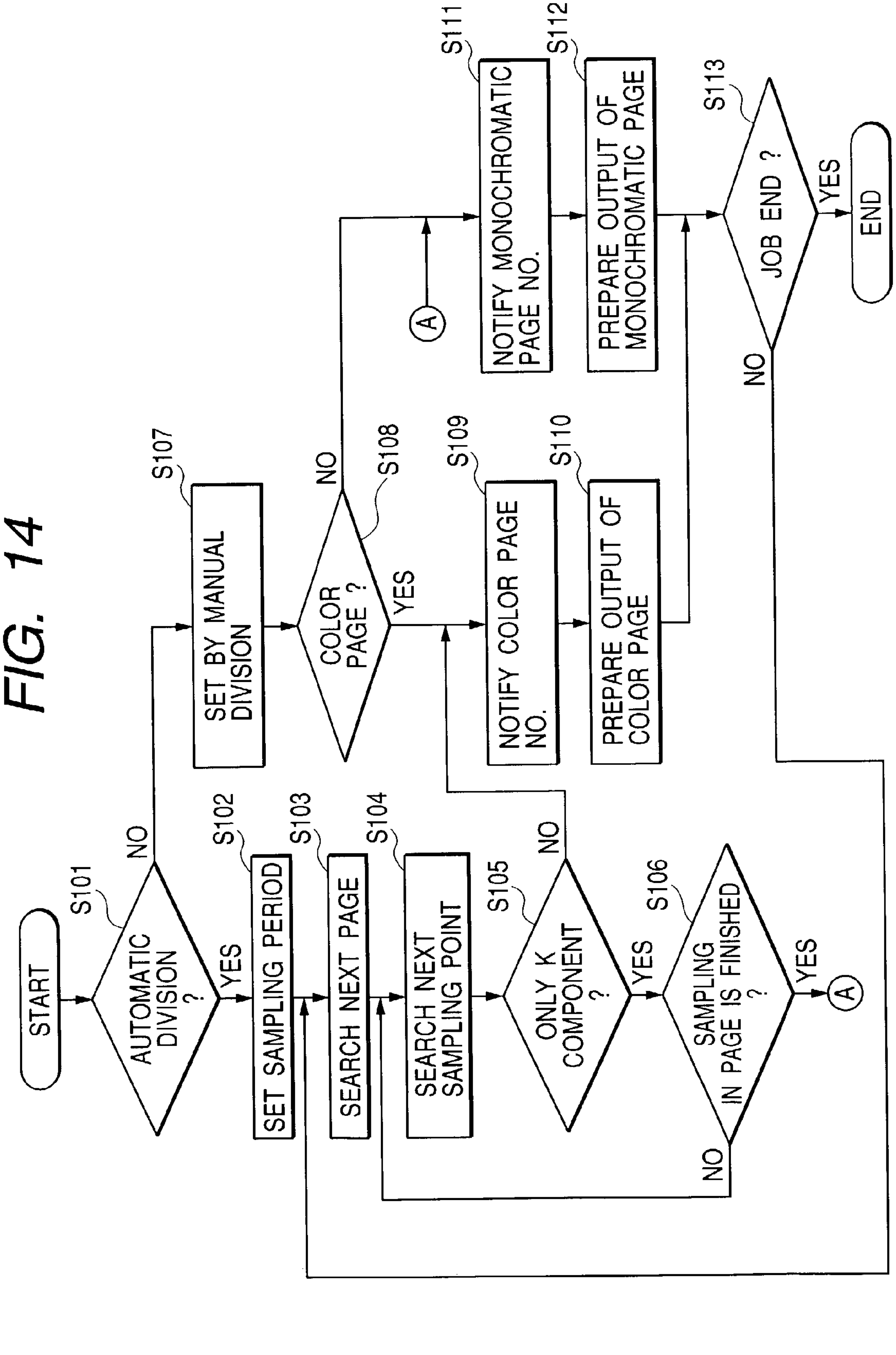
FIG. 14 is a flowchart showing a flow for the color/monochromatic discriminating operation.

The dividing operation of a color/monochromatic job will now be described with reference to FIG. 14. When the OK key 1308 of a printer driver 1301 is pressed, the same job is sent to the color MFP 104 and monochromatic MFP 105. As a sending order, it can be sent in order of the color MFP and the monochromatic MFP by shifting the sending timing or can be also simultaneously sent to the two MFPs.

At this time, if the system has been set to the automatic division of the job in step S101 (YES in S101), a sampling period is subsequently set (S102). The sampling period, however, is previously set in a property key 1314. For example, by sampling at a rate of one point per (100 pixels×100 lines), a sampling time can be merely set to 1/10000. If a resolution of the image is equal to 400 dpi, by sampling on a unit basis of a lattice of a period of 0.25 inch (=6.35 mm), points near 1500 points are sampled by paper of a letter size (11 inches×8.5 inches). Whether the image is a color image or a monochromatic image can be discriminated to a certain extent.

Subsequently, the PDL unit 205 of the color MFP 104 which received the job sequentially performs a raster image processing (RIP) to the pages included in the job and stores the images obtained after completion of the RIP into the semiconductor memory 605 page by page every color component (CMYK). Whether the stored image is a color image or a monochromatic image is discriminated by the CPU unit 603. This discrimination is made by checking whether a component (CMY component) other than black (K) exists at each sampling point in the semiconductor memory 605 or not.

First, the first page is searched from the pages which are recorded in the semiconductor memory 605 (S103). If the first page has been searched, the first sampling point on the searched page is searched (S104). Whether the image is a color image or a monochromatic image is discriminated with respect to the searched sampling point (S105). In the color/monochromatic discrimination, whether the component (CMY component) other than black (K) exists at the sampling point or not is discriminated. If it is determined that the image of only the black component exists at the searched sampling point (YES in S105), whether the relevant sampling point is the last sampling point in this page or not is discriminated (S106). The sampling points including the components other than black are searched until the last sampling point in the relevant page as mentioned above.

If it is determined that the component other than black exists at least at one point in the relevant page (NO in S105), this page is determined to be a color page. In order to raise a processing speed, the color/monochromatic discrimination is stopped at that time point and this page is processed in the color MFP 104. Since there is a case where a request for reprinting is generated in response to this job, the server 102 is notified of page number information of this color page from the color MFP 104 via the network 101 (S109). In the color MFP 104, output preparation for the color page is completed (S110).

On the contrary, if a color (CMY) component does not exist at any of the sampling points in the page, this page is decided to be a monochromatic page and processed in the monochromatic MFP 105. The server 102 and monochromatic MFP 105 are notified of page number information of this monochromatic page from the color MFP 104 via the network 101 (S111). In the monochromatic MFP 105, output preparation for the monochromatic page is completed (S112).

For example, in case of a sampling rate of one point per (100×100 lines), if the color/monochromatic discrimination is difficult, the sampling period can be set further finely or the dividing mode can be set to the manual division in the property key 1314 (S107). According to the manual division, for example, a discrimination result about whether the page is a color page or a monochromatic page can be preset every page.

Assuming that the color page and the monochromatic page have been preset by the manual operation, whether the page is a color page or not is subsequently discriminated every page on the basis of contents of the setup (S108). If it is determined that the page as a discrimination target is the color page (YES in S108), the server 102 is again notified of the page number information of this color page from the color MFP 104 via the network 101 in consideration of a possibility of generation of a printing request in response to this job (S109). After completion of the notification, in the color MFP 104, output preparation for the color page is completed (S110).

If it is decided that the discrimination target page is the monochromatic page (NO in S108), the color MFP 104 notifies the monochromatic MFP 105 of the page number information of this monochromatic page and also notifies the server 102 of this monochromatic page number information in consideration of a possibility of generation of the reprinting request. When the monochromatic MFP 105 receives the notification from the color MFP 104, output preparation for the monochromatic page is completed (S112).

As for the processes regarding the color/monochromatic discrimination and the page output described above, unless an interruption of job cancellation occurs, whether the page which is being processed is the last page or not is discriminated (S113) and the above processes are repeated until the last page.

First Embodiment (Print Area)

Figure 15:
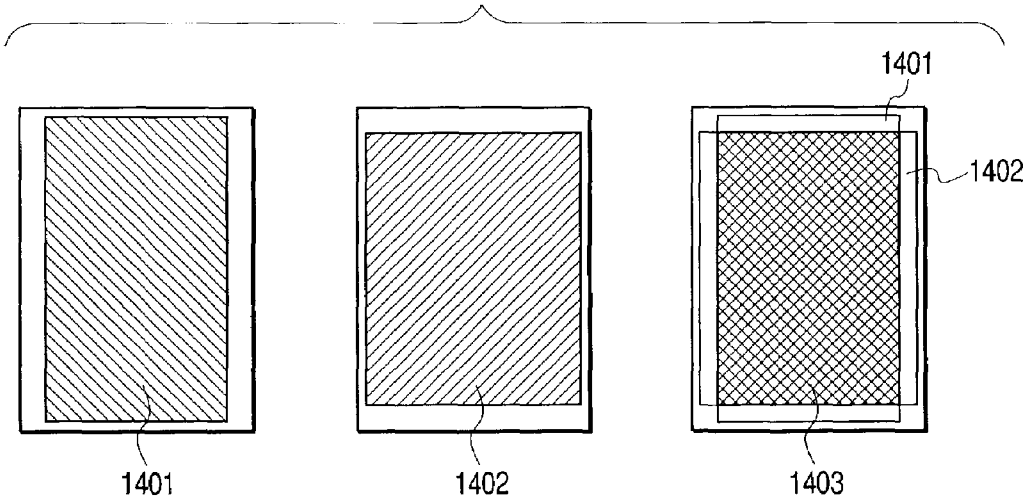
FIG. 15 is a diagram showing a relation between a print area of each MFP and the print area upon distribution print.

The print area in the first embodiment of the invention will now be described with reference to FIG. 15. Reference numeral 1401 denotes a print area in the color MFP 104 and 1402 denotes a print area in the monochromatic MFP 105. As print areas in the color MFP 104 and monochromatic MFP 105 upon distribution print, an AND area 1403 of the print areas 1401 and 1402, that is, the area 1403 in which both of the print areas 1401 and 1402 overlap on the output original is set. Thus, even if the original is outputted from either the color MFP 104 or monochromatic MFP 105 upon distribution print, since the print area 1403 is the area included in both of the print areas 1401 and 1402, a print result in which there is no missing part of the image can be obtained.

(Print Area Setting Means)

Figure 16:
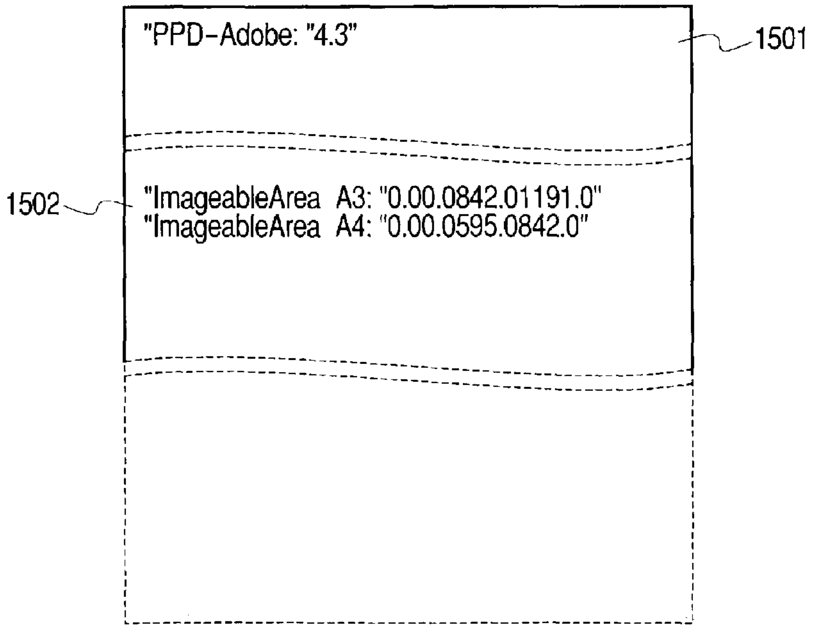
FIG. 16 is a diagram showing a PPD file for setting the print area upon distribution print.

As shown in FIG. 16, the setting of the print area is performed in a PPD (PostScript Printer Description) file 1501. Reference numeral 1502 in the PPD file 1501 denotes a definition of the print area at each output paper size. The user can set the print area upon distribution print like 1403 in FIG. 15 or 1603 in FIG. 17 on the server 102 or client 103 every output paper size. Besides, information regarding the function of the server 102 or client 103 is included in the PPD file 1501. The PPD file 1501 controls the printing operation of the color MFP 104 or the monochromatic MFP 105 together with the printer driver 1301.

Second Embodiment

Figure 17:
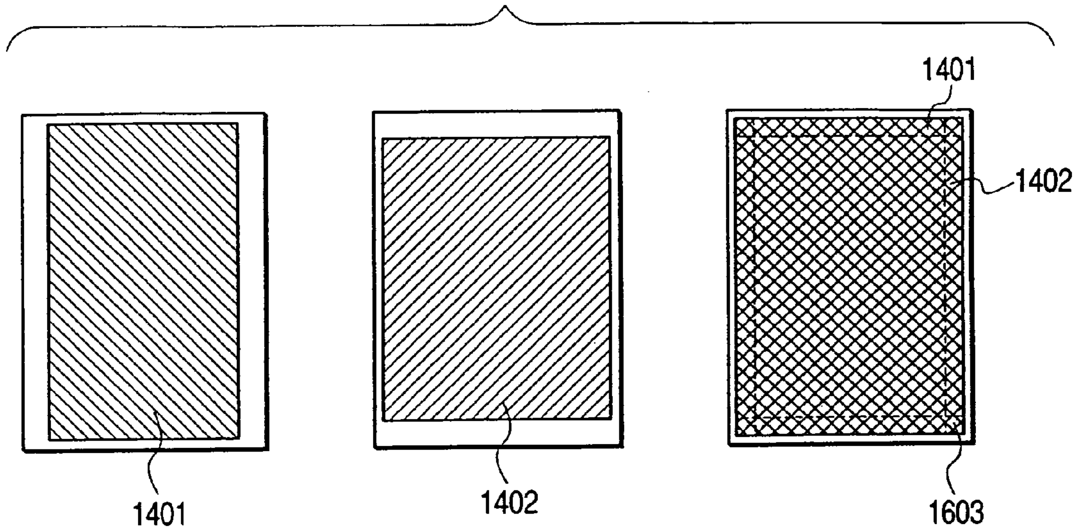
FIG. 17 is a diagram showing a relation between a print area of each MFP and the print area upon distribution print according to another embodiment.
Figure 18:
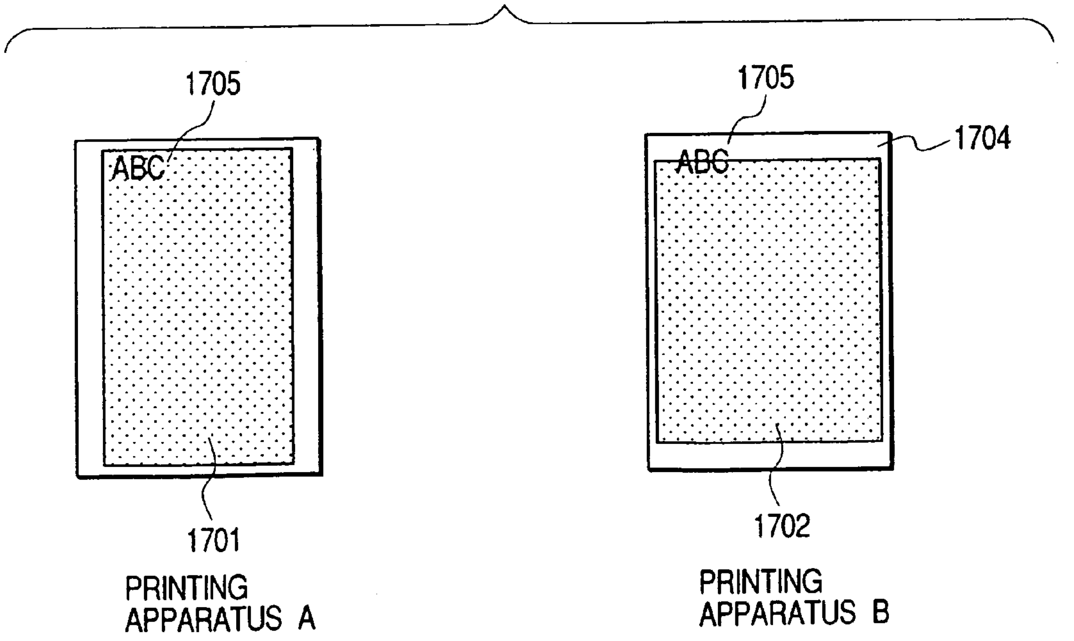
FIG. 18 is a diagram for explaining a print area upon distribution print in a conventional technique and a drawback due to the print area.

In the first embodiment, the AND area of the print area 1401 of the color MFP 104 and the print area 1402 of the monochromatic MFP 105 has been used as a print area upon distribution print. In the second embodiment, however, as shown in FIG. 17, an OR area 1603 of the print areas 1401 and 1402, that is, the area 1603 including both of the print areas 1401 and 1402 has been set as a print area upon distribution print.

Thus, since a surplus area which exceeds the print area 1401 or 1402 exists in the print area 1603 upon distribution print, there is a possibility that a part of the image which is outputted from the color MFP 104 or monochromatic MFP 105 is missing. However, the print areas 1401 and 1402 in the color MFP 104 and monochromatic MFP 105 can be maximally used.

Third Embodiment

In the first embodiment, the print area upon distribution print has been set as an AND area 1403. In the second embodiment, the print area upon distribution print has been set as an OR area 1603. As a third embodiment, the invention can be further constructed so that either the AND area 1403 or OR area 1603 can be selected as a print area upon distribution print. Selecting means of such a print area (print area selecting means) can be realized by, for example, adding a setting item for selecting the print area upon distribution print to the printer driver 1301 or the like. Thus, the user can select the print area in consideration of an advantage of each of the print areas 1403 and 1603. By the third embodiment, the print area in which the print areas of a plurality of printers overlap or the print area including one of the print areas of a plurality of printers can be selected as a print area upon distribution print. A mechanism such that the print area of the selected kind is set as a printable area is realized.

Fourth Embodiment

In the fourth embodiment, a preferred embodiment regarding a print control system mainly comprising a client, a printer server, and a printer device will be described. The print control system can be also realized by a system constructed by a single information processing apparatus having functions of respective apparatuses, which will be explained hereinlater. It is presumed that the system can be realized also by providing means for realizing the various functions for a specific apparatus. The functions which will be explained hereinlater are based on the constructions described in the first to third embodiments. It is assumed that the client, printer server, and printer device in the fourth embodiment have at least the functions of the first to third embodiments.

Figure 19:
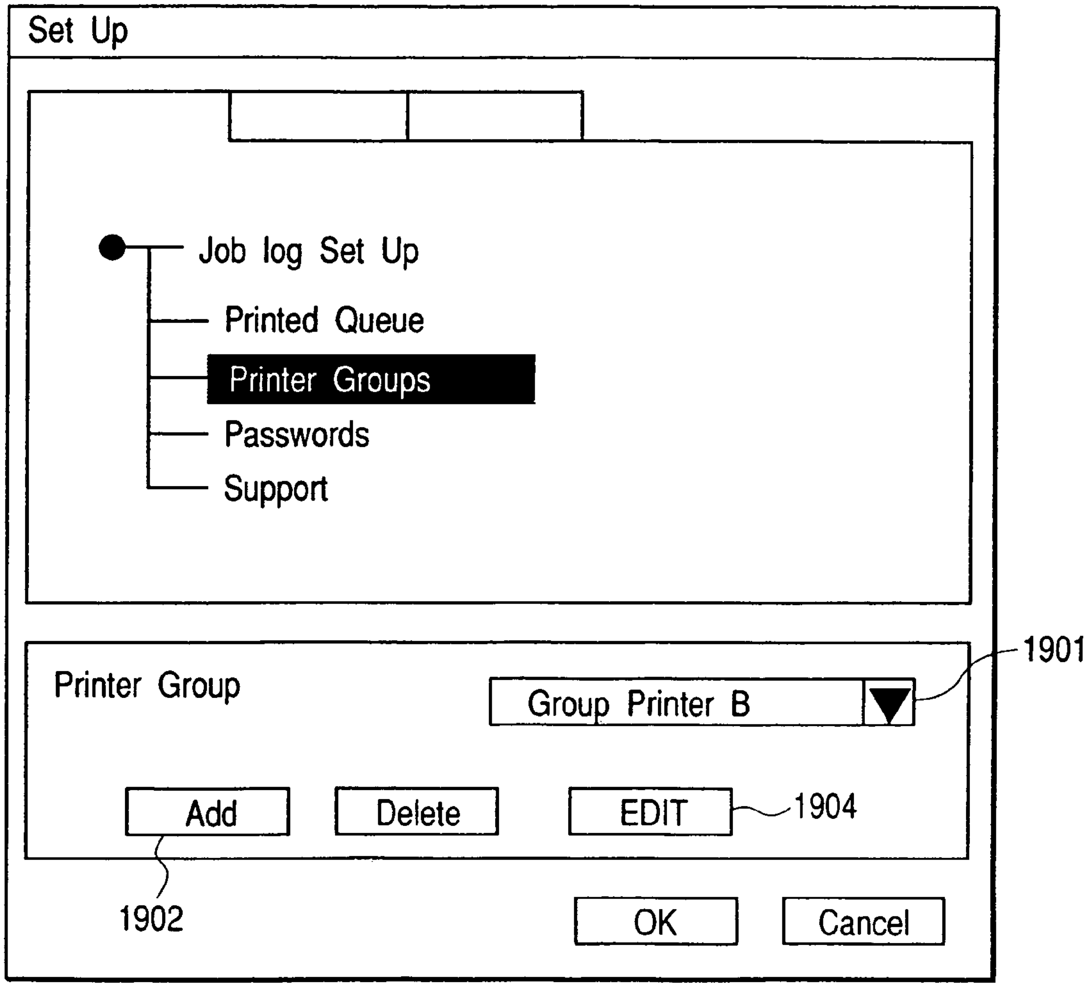
FIG. 19 is a diagram showing a user interface in case of setting a virtual printer into a system.

FIG. 19 shows a setup picture plane of a virtual printer in the server 102 in the print control system (which, for example, can correspond to FIG. 1). In the diagram, reference numeral 1901 denotes a virtual printer which has previously been registered in a database. The database can correspond to a non-volatile memory unit provided for the server 102, a predetermined recording medium such as a CD-ROM or the like which can be inserted into the server 102 or a memory unit which can be referred to by the server 102 via the network.

When a box "Add" 1902 in the diagram is clicked by a mouse or the like, a setup picture plane (not shown) for adding a virtual printer is activated. When a box "Edit" 1904 in the diagram is clicked, detailed information regarding the virtual printer selected at present by clicking the box 1901 is displayed (not shown). As such detailed information, addition/deletion of devices corresponding to the virtual printer, a print setup of each resolution or the like of a plurality of devices corresponding to the virtual printer, an output port setup of the virtual printer or each device, and the like can be performed.

A definition of a term "virtual printer" in the embodiment will now be described. The virtual printer in the embodiment denotes a printer associated with a plurality of printers and has functions for forming information for controlling so that the plurality of printers execute the printing and forming print data serving as a base of data that is transmitted to the plurality of printers. The formed data is transmitted in its own format to each printer or converted into a data format which is peculiar to each printer and, thereafter, transmitted to each printer.

An explanation will now be made in the embodiment on the assumption that, the data formed via the virtual printer has a format corresponding to the data which is used when the printer server 102 executes a print control process. However, by providing the functions of the printer server 102 as software modules for each client 103, the print control process of the printer server 102 can be also presumed as a process of the client 103.

As a format of the data which is formed by the virtual printer, for example, it is possible to apply a PS (PostScript) made by Adobe Systems Incorporated, a PDF (Portable Document Format) likewise made by Adobe Systems Incorporated, an SVG (Scalable Vector Graphics) as one of the image data formats developed for Web, or the like. The data in a format which can express drawing information without substantially depending on a platform (OS) can be mentioned as a preferable use example. The print control process of the printer server 102 will be explained in detail hereinlater.

It is assumed that the printer in the embodiment denotes a combination of the printer driver and an output port or the printer device itself corresponding to the output port.

FIGS. 20 and 21 show various setup information which is held in the printer server 102 in accordance with the setup which is performed via the user interface in FIG. 19. In FIG. 20, "printer name" corresponds to the name of the virtual printer. "Constructing printer" shows a plurality of printers associated with the virtual printer. Reference numeral 2001 denotes a printable area of each paper size in each virtual printer. As a printable area corresponding to the virtual printer of the printer name 2002, it is presumed that a printable area (called an AND area) which is common to any printer is used or a printable area (called an OR area) which is included in one of the printers is used for each printer in "constructing printer".

FIG. 21 shows a printable area of each paper size of each printer, and this area has a data structure which is associated with information shown in FIG. 20 so that the computer refers to details of the constructing printer which constructs the virtual printer name in FIG. 20. With respect to the printable area of the virtual printer in FIG. 20, there is presumed a process (client side or server 102 side) for extracting the printable area of each constructing printer corresponding to the virtual printer from information shown in FIG. 21 and calculating the printable area (the AND area and/or the OR area) as shown in FIG. 20 each time or a system such that the information as shown in FIG. 20 is prepared in correspondence to the constructing printer which is presumed. By preparing the information as shown in FIG. 20, the process for calculating the printable area of the virtual printer each time can be omitted. A print control system of a higher speed is realized.

As for the storage of the information as shown in FIGS. 20 or 21 as described above, it is written into a field of the printable area of a PPD file (also called a print information storage file) or into a vender expansion area in correspondence to the printer selected by the user via the setup picture plane of FIG. 22, which will be explained hereinlater. Such information is presented as a printer object on a client screen in a construction such that it can be used.

Figure 22:
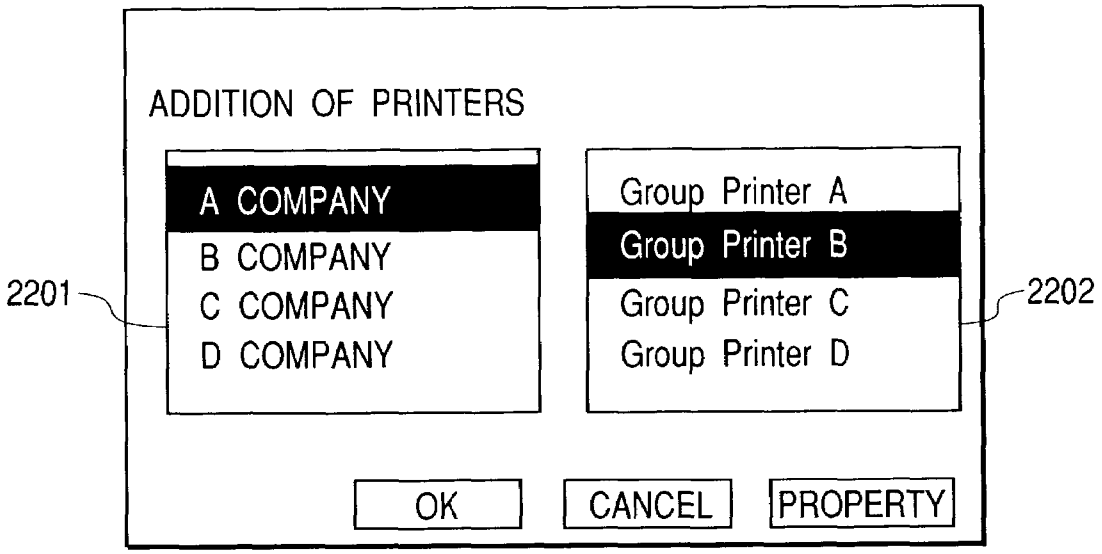
FIG. 22 is a diagram showing the user interface for setting the virtual printer in the client.

FIG. 22 shows a user interface for adding virtual printers displayed in a display unit on the client side (corresponding to 103 in FIG. 1). It corresponds to a state where statuses of the virtual printers installed in the printer server 102 described above are displayed on the client side. The client 103 requests the printer server 102 to obtain the virtual printer information (FIGS. 20 or 21), so that the information for allowing the user interface as shown in FIG. 22 to be displayed is received on the client side, and information as shown in columns 2201 and 2202 is embedded into FIG. 22. Reference numeral 2201 denotes a provider (name of a party such as manufacturer, dealer, etc. who provides the printers) of the virtual printer. Reference numeral 2202 denotes a plurality of virtual printers corresponding to the provider of the virtual printer selected in 2201. The user can indicate a desired virtual printer from the virtual printers shown in 2202 by using a pointing device such as a mouse or the like. Various information regarding at least the indicated virtual printer is transmitted from the printer server 102 to the client 103 and stored into a predetermined memory unit in a readable format. An overlap print area corresponding to one of the plurality of virtual printers selected in accordance with the instruction of the user is extracted and can be set as a print area of the selected virtual printer into the PPD file.

As information which is installed into the client 103, the print area information extracted from FIGS. 20 and 21 in correspondence to the selected virtual printer, a virtual printer main body for forming the print data serving as a base of the data which is transmitted to a plurality of printers, output port information corresponding to the virtual printer, default print setup (paper size), etc. are included. The information regarding the virtual printer installed to the user destination side is associated with the printer object and presented to the client in a construction such that the user can select and use it. The print area information extracted from FIGS. 20 and 21 in correspondence to the virtual printer selected by the user is preliminarily stored into the PPD file and held into the client in a construction such that it can be used. Therefore, a printable area recognizing process of a high speed is realized as a format such that the printable areas for a plurality of printers are obtained by inquiring each printer about it each time.

In the embodiment, a distribution printing process, which will be explained hereinlater, for distributing a printing process to a plurality of printers is executed by the virtual printer installed into the client 103 via the setup picture plane of the virtual printer in FIG. 22.

(Print Control Process in the Client)

A print control process in the client will now be described with reference to FIGS. 23 and 24.

Figure 23:
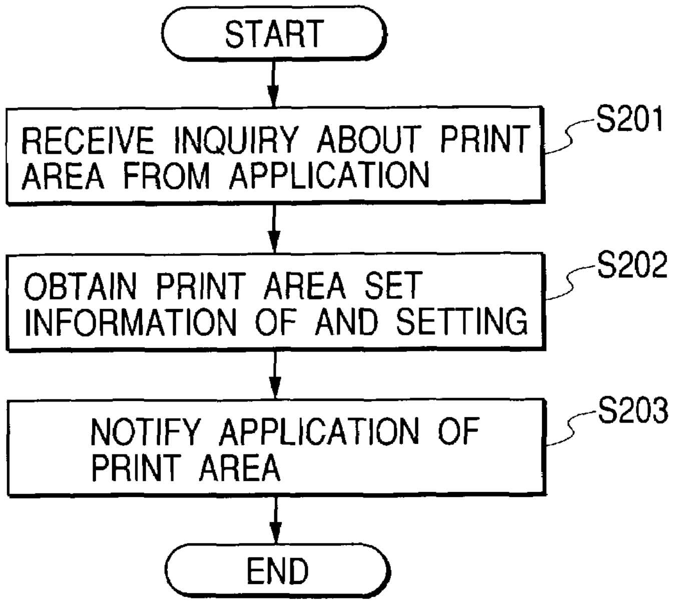
FIG. 23 is a flowchart showing a responding process of a printable area of AND setting in response to an inquiry about the printable area information.
Figure 25A:
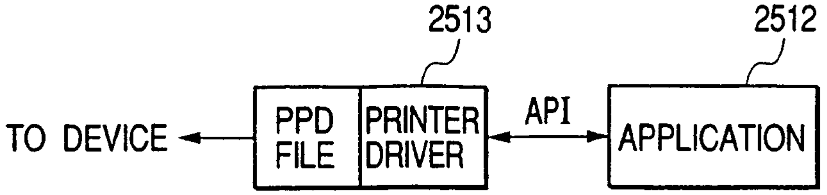
FIGS. 25A, 25B, and 25C are conceptual diagrams of a software module construction in the client in the print control system.
Figure 25B:
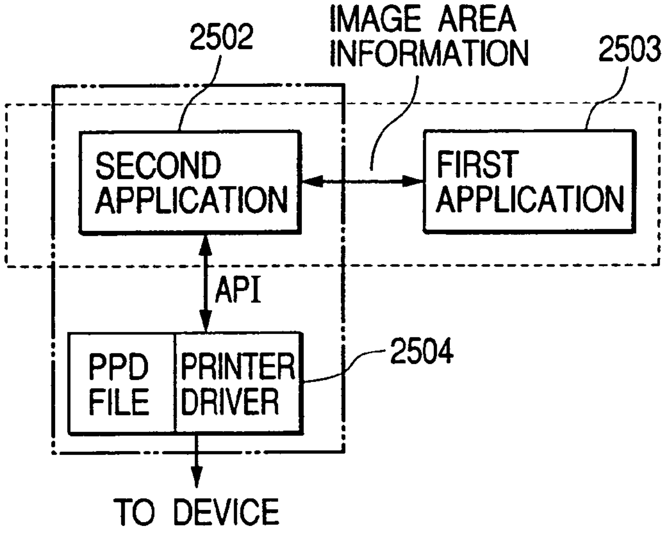
Figure 25C:
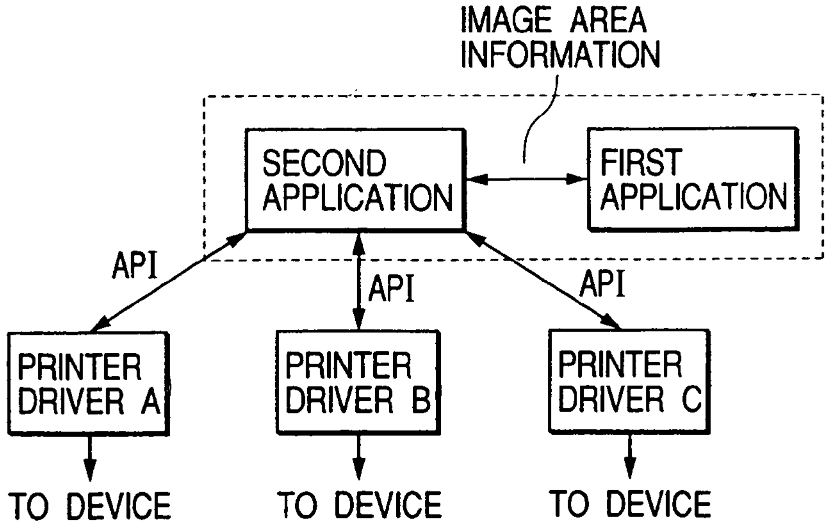

FIG. 23 will be explained on the basis of a mechanism of FIG. 25A. FIGS. 25A to 25C show conceptual block diagrams of software modules in the client.

First, in step S201, an inquiry about the print area from the application is received. In next step S202, if the setup of the print area has been defined in the AND area of each printer as shown in the first embodiment, information of the print area of the AND setting is obtained from the PPD file (shown in FIG. 16) in step S202. The application is notified of the print area information in step S203.

The inquiry about the printable area information and the obtainment thereof in the application will be described further in detail. As for the inquiry about the printable area, a command (API) which has been published via the mechanism of the OS and inquires the print area itself can be used, or as a command to request a file as a PPD file, it is also possible to analyze contents of the PPD file obtained in accordance with the request and recognize the information of the printable area stored in the PPD file. The information of the print area stored in the PPD file corresponds to the information which has been extracted from FIGS. 20 or 21 in correspondence to the virtual printer selected by the user and set into the PPD file. The inquiry format is not limited to the format such that the print area is inquired via the OS but it is also possible to use another format such that the print area is inquired between the applications or between the application and the printer driver by using a unique command.

Since a control is performed in step S203 in a manner such that the second application allows the first application to notify the AND printable area in a plurality of printers, the first application can discriminate on the basis of the notified information whether a missing of a part of an image occurs in a print result or not. If a part of the image is missing, a warning picture plane is displayed in order to generate a warning.

When an instruction to execute the printing from the user is confirmed, the image data formed by the application or the data obtained by converting the image data into a predetermined format and various data obtained by the operation shown in the flowchart of FIG. 23 are transmitted to the printer server 102.

In the print control system for controlling the printing process in which a job has been distributed to a plurality of printers in accordance with a print command that is received via the virtual printer on the basis of the flowchart of FIG. 23 or the printable area information which is stored in the PPD file (shown in FIG. 16) as mentioned above, a mechanism of setting means for setting the print area in which the print areas by the plurality of printers overlap as a print area upon distribution print and response control means for allowing the print area set by the setting means to respond in accordance with the inquiry from the application is realized. Therefore, the user can be efficiently notified of at least information indicating in which printer a missing of a part of the image occurs.

The operation based on a mechanism of FIG. 25B will now be described. FIG. 25B shows a conceptual block diagram of a software module in the client obtained by further developing the software module of FIG. 25A. A first application 2503 denotes an application such as word processor application like Microsoft Word (registered trademark), drawing application for editing character and figure information, or the like which operates on a predetermined OS (for example, Microsoft Windows 2000). A second application 2502 fetches image information set by the first application, recognizes it into an image area, inquires of a printer driver 2504 about the printable area by a unique inquiry command (disclosed as an API in the diagram), compares a result which is responded from the printer driver 2504 with the information of the image area which has already been recognized, and executes various operations. Details of the operations will be described hereinbelow with reference to FIG. 24.

First, in step S301, the second application recognizes a print start command and obtains the information of the image area. The obtainment of the information of the image area in drawing data (including an original bit map image according to a draw command) formed by the first application or the second application will be explained in detail. First, the image area in the embodiment indicates an area which is determined on the basis of a paper size and a blank area or an area in which an image has actually been drawn by the application. The second application 2502 has a function such that the drawing data formed by the first application 2503 is fetched in a file format which can be interpreted by at least the printer driver 2504. As a file format, data in the PDF format or data in the SVG format described above is presumed. The various information such as paper size, blank area, and the like is transmitted from the first application to the second application. Thus, the second application can recognize the information (aspect size at which an image can be drawn) of the image area in the first application.

As another preferred embodiment, it is also possible to use a method of calculating an actual image area from coordinates information or the like held by the second application itself, that is, the coordinates information of the drawing data which has actually been drawn or the like. Thus, the second application can recognize the accurate image area information. In the format as shown in FIGS. 25B or 25C, it is also possible to enable the second application to inquire of the first application about the image area via the API to be obtained. On the other hand, in the format as shown in FIG. 23, a format such that the application obtains the printable areas of a plurality of printers in the virtual printer and discriminates whether the image area is included in the print area of each printer or not is also presumed.

Figure 24:
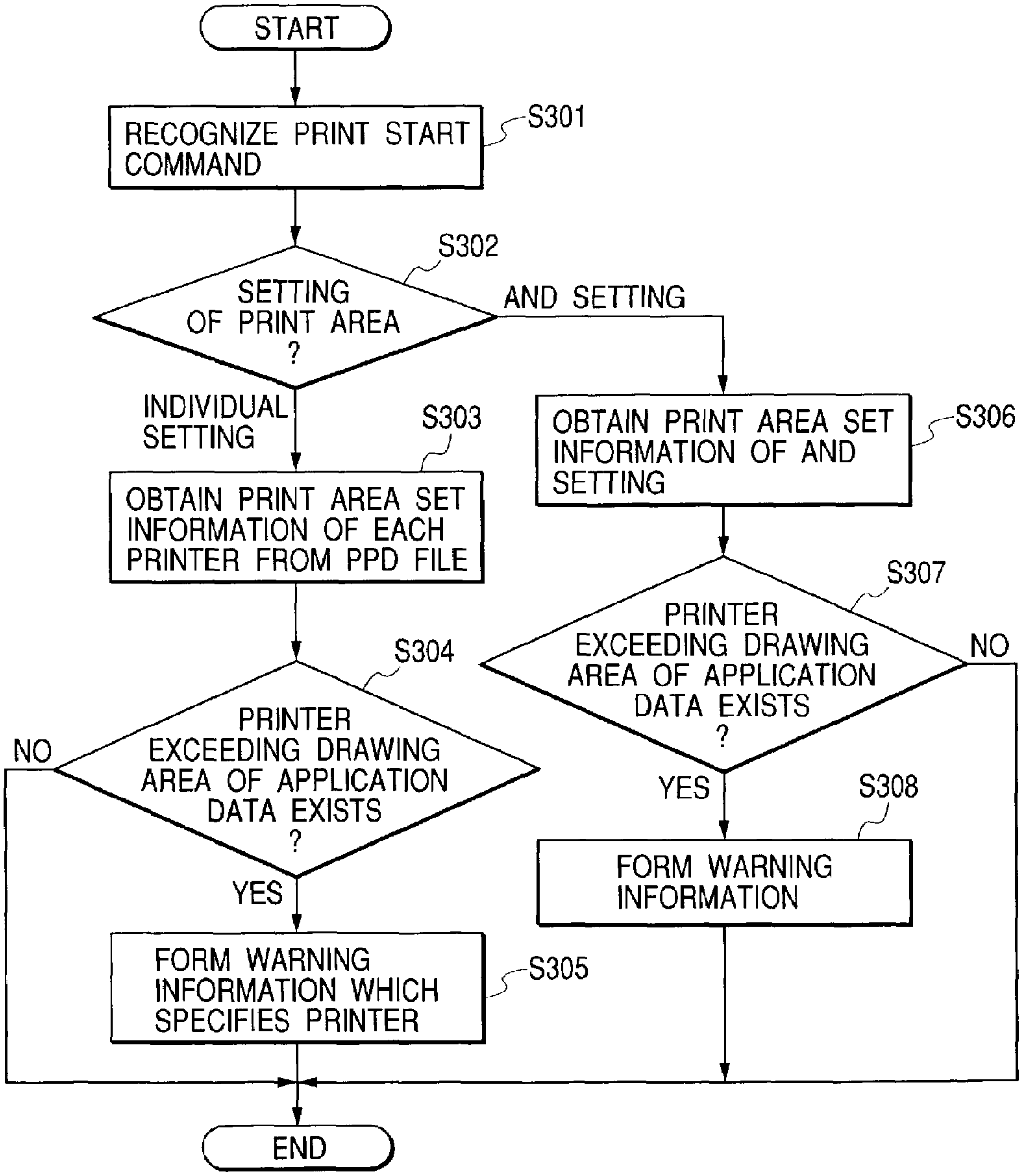
FIG. 24 is a flowchart showing the operation which corresponds to individual setting and AND setting and is accompanied by a generating process of warning information according to image area information and the printable area information.

Returning to the description of FIG. 24, in step S302, whether the print area setup set via the user interface as shown in FIG. 13 (it is assumed that the print area has been set by a virtual printer UI) is the AND setting or the individual setting of each printer is discriminated, and the process is distributed.

In case of the individual setting, a process for obtaining the information of the printable area of each printer from the PPD file together with an identifier and comparing them with the drawing area of the application data is executed in step S303. Whether the printer such that the image area of the application exceeds the printable area exists or not is discriminated (S304). As described above, a mechanism of inquiring the printable area can be obtained, for example, from the PPD file.

If it is determined in step S304 that the printer such that the image area of the application exceeds one of the printable areas exists, such a printer is specified. Information for alarming the fact that the application has specified the printer is formed in step S305. Since the information for allowing the formed warning to be displayed is formed, a warning picture plane indicative of a missing part of the image (corresponding to FIG. 26) which enables the specific printer to be identified is displayed in the display unit of the client.

If it is decided in step S302 that the print area setup is the AND setting, information of the print area of the AND setting is obtained in step S306 and whether the print area exceeds the drawing area of the application data or not is discriminated (S307). If YES, warning information is formed in step S308.

If a print execution command from the user is confirmed, the image data formed by the application or the data obtained by converting the image data into the predetermined format and the various data obtained by the operation shown in the flowchart of FIG. 24 are transmitted to the printer server 102. As mentioned above, there is realized a mechanism comprising the recognizing means for recognizing the printable area of each of the plurality of printers on the basis of the process in each step in FIG. 24, the discriminating means for discriminating whether the image area formed (set) by the application is included in the printable area of each of the plurality of printers recognized by the recognizing means or not, and the warning information forming means for forming the information to generate the warning on the basis of each discrimination result by the discriminating means as mentioned above.

Although the first application and the second applications have been described separately in FIG. 25B, it is also presumed that the application function of FIG. 25B is provided for an application 2512 in FIG. 25A. That is, in FIG. 25A, if a printer driver 2513 is allowed to notify the application 2512 of the printable area in each of the plurality of printers in correspondence to the identifier (IP address, printer name, or the like) of the printer, the application 2512 compares the printable area corresponding to each printer identifier notified via the API with the drawing area and the application 2512 itself can generate a warning showing in which printer a missing part of an image occurs. Thus, the discriminating step about whether the image area formed (set) by the application is included in the printable area of each of the plurality of printers or not can be realized by a simple software construction.

Besides the format of obtaining the printable area information of each printer (including the virtual printer) set in the PPD file as shown in FIG. 25B, the invention can be also applied to a mechanism as shown in FIG. 25C such that the printer driver corresponding to each printer is inquired about performance (printable area of each paper size) of each printer, the information of the AND printable area and the printable area information of each printer are recognized in accordance with the result of the inquiry, the second application or an application obtained by combining the first and second applications can form the information for warning, and the PPD file is not provided.

Figure 26:
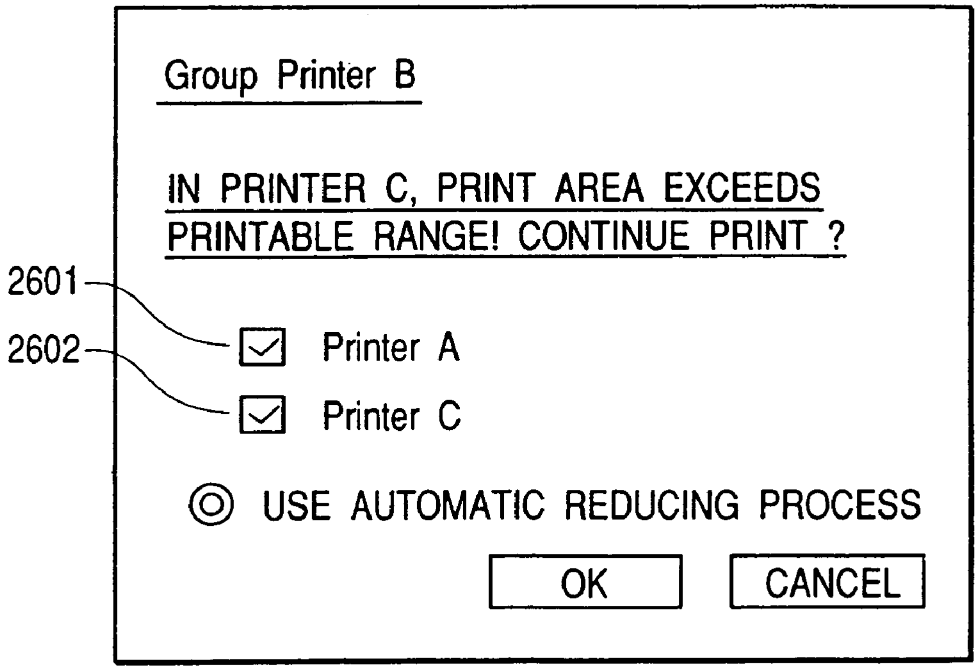
FIG. 26 is a diagram showing a warning indication.

FIG. 26 shows a state of a warning picture plane which is displayed in the display unit of the client in the case where the print execution command is issued to the OS from the first or second application in accordance with the instruction from the user.

Reference numerals 2601 and 2602 denote printers (also called member printers) associated with the virtual printer (Group Printer B in the diagram) which has been set at present. Each of check boxes shown at 2601 and 2602 denotes a user interface for temporarily removing one of the member printers as a printer constructing the virtual printer. Naturally, after the check mark in the check box is reset, if it is checked again, the removed printer can be also used as a constructing printer.

By forming the warning picture plane as shown in FIG. 26 and displaying it into the display unit of the client, the user can obtain a satisfactory print result by reducing the image area formed by the application (for example, by changing the paper size to a small size or setting the blank area to a large area again), using a printer automatic reducing process, which will be explained hereinlater, or temporarily removing "Printer C" from the member printers associated with the virtual printer. It is presumed that the means (software module) serving as a main member for displaying the warning as shown in FIG. 26 can be the second application (printer driver) or the first application as described in FIGS. 25A to 25C.

(Print Control Process in the Server)

A print control process in the printer server 102 will now be described with reference to FIGS. 27 and 28.

Figure 27:
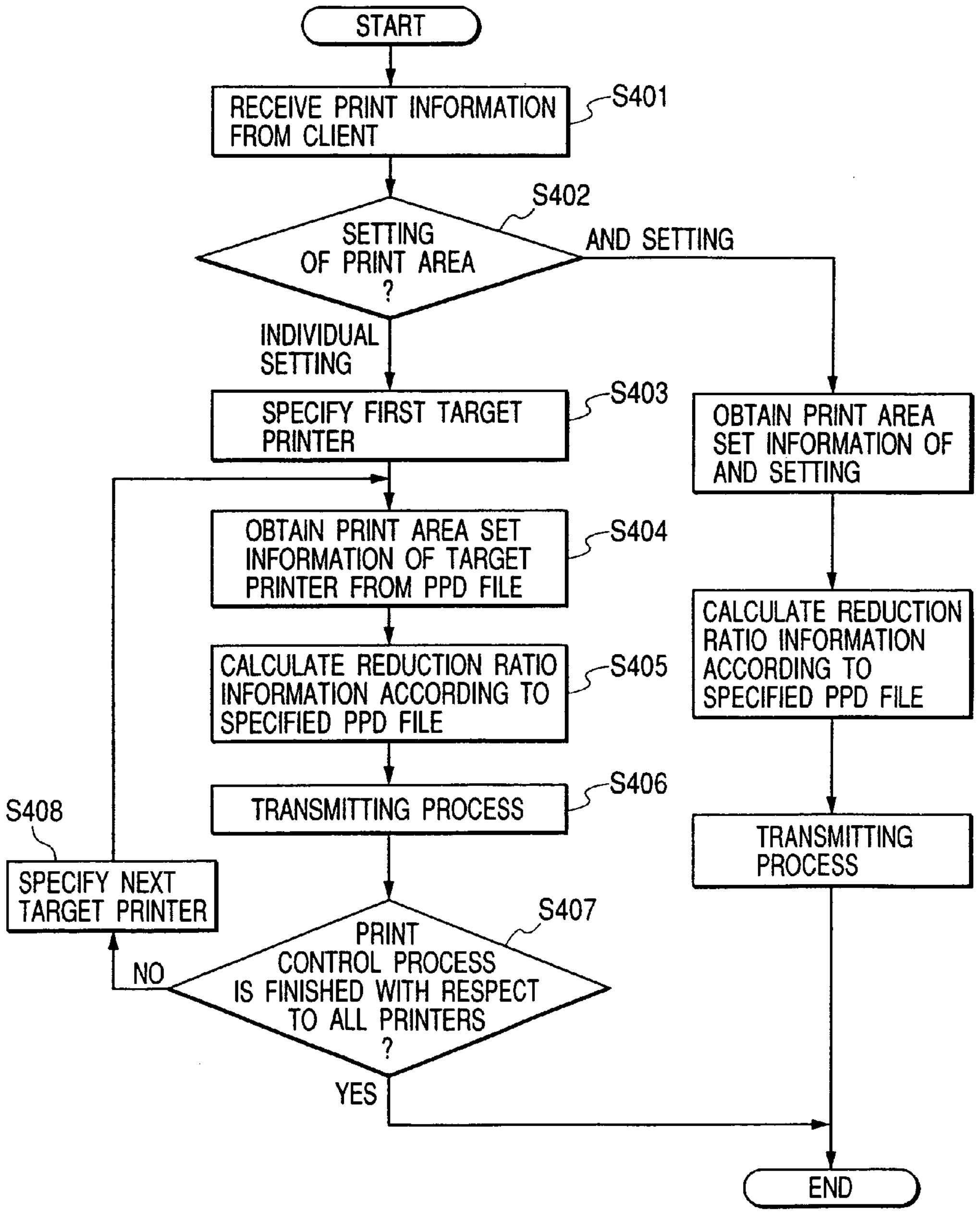
FIG. 27 is a flowchart showing the operation of an information processing apparatus associated with an automatic reducing process of an image.

FIG. 27 is a flowchart in case of executing the automatic reducing process. The automatic reducing process is executed by the printer server 102 in the case where a check box 2603 in FIG. 26 is checked.

First, if print information from the client is received together with print area setup information (corresponding to step S302) in step S401, the process is distributed in accordance with a discrimination result about whether the print area setting is the AND setting or the individual setting of each printer in step S402. The server side can also have a PPD file similar to that on the client side and the program on the server side can discriminate the printable area each time with reference to the PPD file.

In case of the individual setting, first, the first target printer of the distribution print is specified (S403). The print area setup information of the target printer is obtained from the PPD file (S404). Subsequently, an image reduction ratio in the device is calculated (S405) in accordance with the print area obtained in step S404 and the image area (image data from the application or intermediate data formed from the application data). The reduction ratio calculated in step S405 is transmitted as a parameter of the print to the printer on the distribution destination side together with the print data (S406). Thus, the printer on the distribution destination side reduces the image in accordance with the reduction ratio parameter and executes a reduction print. If a next printer exists in step S407, a next target printer is specified in step S408. Processes similar to those mentioned above are repeated and the distribution printing process is executed with respect to all target printers.

If the print area setting is the AND setting as well in step S402, in case of the similar processes, a reduction ratio is calculated on the basis of the AND area of the print area of the distribution printer instead of the print area corresponding to each printer. As for the reduction ratio, whether the reduction is unnecessary for the blank setting of the application or not is discriminated. If it is unnecessary, the arithmetic operating process of the reduction ratio can be also omitted. Further, if there is a surplus area in the printable area in the printer with respect to the setup of the application, an enlarging process can be also executed. Although the printer has reduced the image as a reducing process by the parameter designation in the server, the image can be also reduced in the server by using a PDF converting process (which will be explained hereinlater) in the server. In a format such that the function of the printer server 102 is provided for the client 103, it is also presumed that the reducing process is executed in the client.

As mentioned above, according to the flowchart of FIG. 27, to decide whether the printer on the distribution destination side is a color printer or a monochromatic printer, the data in a predetermined format (PDF format) is analyzed and whether color data is included in each page or not is discriminated. In accordance with a discrimination result, it is determined that the print data based on the data in the predetermined format is outputted to the color printer or the monochromatic printer. Further, in accordance with a discrimination result about whether the decided printer is a printer corresponding to the data in the predetermined data format or not, whether the data in the predetermined format is outputted or the page description language based on the predetermined format is outputted or not can be determined. Therefore, a print control system which can output printed matter at a higher speed is realized.

Figure 28:
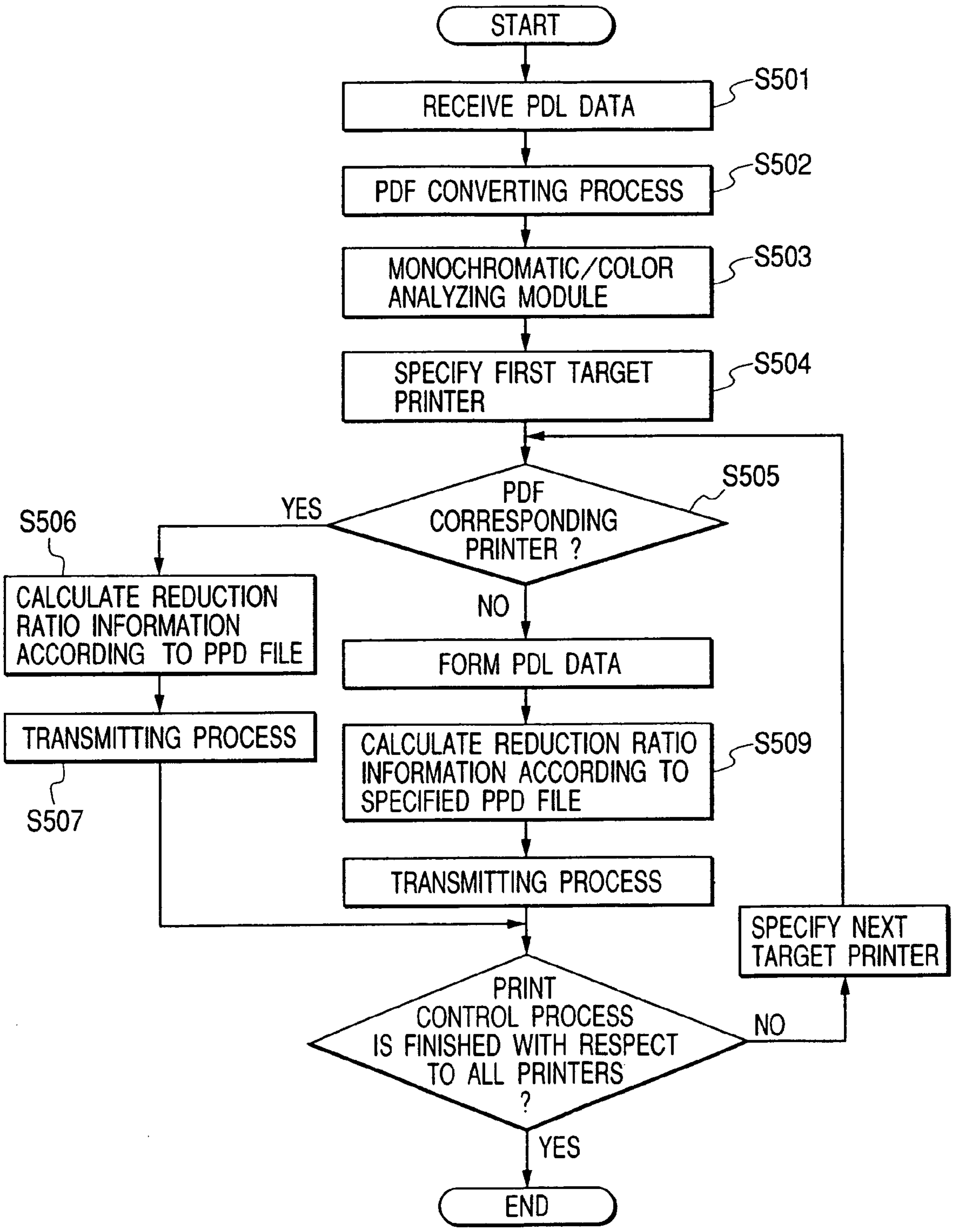
FIG. 28 is a flowchart showing a print data forming process according to a type of printer on an output destination side.

FIG. 28 is a flowchart in case of selectively using the printer corresponding to the PDF and the printer which does not correspond to the PDF as a printer on the distribution destination side.

When the data in the predetermined format (for example, page description language (PDL) described by the PS language) is received from the client in step S501, the printer server 102 converts it into the data in the PDF format (S502).

This is because, generally, since the PDL data is not the data of a page unit (page independent), it is difficult to extract the PDL data to be distributed to each printer and printed from the whole job every page. By converting the PDL data into the independent PDF data page by page, the page unit data can be easily extracted. Also in the discrimination about the color/monochromatic printer, similarly, by converting the PDL data into the page independent PDF data, the color/monochromatic distribution can be easily performed.

Subsequently, in step S503, the PDF data formed in step S502 by the monochromatic/color analyzing module is analyzed, thereby discriminating whether the data is color data or monochromatic data. In step S504, the first target printer of the distribution print is specified. In step S505, whether this printer is a printer corresponding to the PDF or not is discriminated. Such a discrimination is made by a method whereby a table as shown in FIG. 29 in which information showing whether each printer is the printer corresponding to the PDF and the printer corresponding to whichever PDF has been stored is preliminarily provided in the server and this table is referred to. There is also presumed a format such that each of the actual printer devices is inquired via a communication line and information regarding the discrimination about whether the printer is the PDF corresponding printer or not and information showing to which page description language the device corresponds are obtained.

If the target printer is the PDF corresponding printer, the transmitting process is executed in the format of the PDF data as it is (S507). If it is determined in step S505 that the printer which is a target printer at present is not the PDF corresponding printer (NO in step S505), the PDL data according to the PDL to which the target printer corresponds is formed and transmitted. Since the reducing process in steps S506 and S509 is similar to that described in FIG. 27, its detailed description is omitted.

Although the PDF data has been analyzed in the description of FIG. 28, naturally, the invention can be also properly applied to any data format so long as it enables the page unit data to be easily extracted. Although the flowcharts of FIGS. 27 and 28 have been described on the assumption that they relate to the process of the printer server 102, a case where the function of the printer server 102 is provided for the client 103, thereby applying it as a process of the client is also presumed.

The invention also incorporates a case where in order to make various devices operative so as to realize the functions of the various means in the embodiments mentioned above, program codes of software to realize the functions of the embodiments are supplied to a computer in an apparatus connected to the various devices, and the various devices are made operative in accordance with the program stored in the computer (a CPU or an MPU) of the apparatus.

In this case, the program codes themselves of the software realize the functions of the embodiments mentioned above, and the program codes themselves and means for supplying the program codes to the computer, for example, a recording medium in which the program codes have been stored constructs the invention. As a recording medium for storing the program codes, for example, a flexible disk, a hard disk, an optical disk, a magnetooptic disk, a CD-ROM, a magnetic tape, a non-volatile memory card, a ROM, or the like can be used.

Naturally, the program codes are included in the embodiments of the invention not only in the case where a computer executes the supplied program codes, so that the functions of the embodiments mentioned above are realized but also in the case where the program codes function in cooperation with an OS (Operating System) which is operating in the computer or another application software or the like, so that the functions of the embodiments mentioned above are realized.

Further, naturally, the invention also incorporates a case where the supplied program codes are stored into a memory equipped by a function expanding board of a computer or a function expanding unit connected to a computer, thereafter, a CPU or the like provided for the function expanding board or the function expanding unit executes a part or all of actual processes on the basis of instructions of the program codes, and the functions of the embodiments mentioned above are realized by those processes.

According to the invention, the area in which the print areas by a plurality of printing apparatuses overlap is set as a print area upon distribution print by the print area setting means, and the proper warning process can be derived in accordance with the setup information and the image data (drawing data formed by the application) to be printed by the user. Therefore, it is possible to urge so that the print area upon distribution print is included in the print areas of all of the printing apparatuses, and upon distribution print, whichever printing apparatus print-outputs the print data, a print result in which there is no missing part of an output image can be obtained.

According to the invention, the area including each print area by a plurality of printing apparatuses can be set as a print area upon distribution print by the print area setting means. Therefore, the print area upon distribution print has a surplus area which exceeds the print area of each printing apparatus and there is a possibility that a missing part of an image occurs in the output image. However, the print output in which the print area of each printing apparatus is most efficiently used can be performed.

Further, according to the invention, the two print areas can be set as a print area upon distribution print by the print area setting means, and one of the two print areas can be selected as a print area upon distribution print by the print area selecting means. Therefore, either a mode to perform the print in which there is no missing part of an image upon distribution print or a mode to perform the print in which the print area of each printing apparatus is most efficiently used can be properly selected.

Moreover, according to the invention, the printer in which there is a possibility that a missing part of an image occurs upon distribution print can be specified and such a possibility can be warned.

What is claimed is:

1. A print control system that controls distribution printing in which a single print job is distributed to a plurality of printers via a network, comprising:

a selecting unit adapted to select one of a first operating method and a second operating method in accordance with a user's selection, wherein the first operating method designates a print area defined by an AND operation of print areas of the plurality of printers, and the second operating method designates a print area defined by an OR operation of the print areas of the plurality of printers;

a print area setting unit adapted to set the print area designated by the first operating method or the second operating method as a print area to be used for the distribution printing in accordance with one of the first and second operating methods selected by said selecting unit; and a distribution unit adapted to distribute the print job to the plurality of printers via the network, wherein the print area set by said print area setting unit is set in the print job.

2. A system according to claim 1, wherein the plurality of printers include a color printer and a monochromatic printer, and wherein the color printer prints at least one color page of a distributed print job and the monochromatic printer prints at least one monochromatic page of the distributed print job.

3. A print control method that controls distribution printing in which a single print job is distributed to a plurality of printers via a network, comprising:

a selecting step of selecting one of a first operating method and a second operating method in accordance with a user's selection, wherein the first operating method designates a common print area defined by an AND operation of print areas of the plurality of printers, and the second operating method designates a print area defined by an OR operation of the print areas of the plurality of printers;

a print area setting step of setting the print area designated by the first operating method or the second operating method as a print area to be used for the distribution printing in accordance with one of the first and second operating methods selected in said selecting step; and a distributing step of distributing the print job to the plurality of printers via the network, wherein the print area set in said print area setting step is set in the print job.

4. A method according to claim 3, wherein the plurality of printers include a color printer and a monochromatic printer, and wherein the color printer prints at least one color page of a distributed print job and the monochromatic printer prints at least one monochromatic page of the distributed print job.

5. A print control program stored on a computer-readable medium which is executed by a computer for controlling a distribution printing in which a single print job is distributed to a plurality of printers via a network, comprising:

a selecting step of selecting one of a first operating method and a second operating method in accordance with a user's selection, wherein the first operating method designates a print area defined by an AND operation of print areas of the plurality of printers, and the second operating method designates a print area defined by an OR operation of the print areas of the plurality of printers;

a print area setting step of setting the print area designated by the first operating method or the second operating method as a print area to be used for the distribution printing in accordance with one of the first and second operating methods selected in said selecting step; and a distributing step of distributing the print job to the plurality of printers via the network, wherein the print area set in said print area setting step is set in the print job.

6. A program according to claim 5, wherein the plurality of printers include a color printer and a monochromatic printer, and wherein the color printer prints at least one color page of a distributed print job and the monochromatic printer prints at least one monochromatic page of the distributed print job.

* * * * *